US012387853B1

(12) United States Patent
Nakamura et al.

(10) Patent No.: US 12,387,853 B1
(45) Date of Patent: Aug. 12, 2025

(54) SYNCHRONIZED LIGHT SOURCE FOR LASER FUSION SYSTEM AND METHOD FOR ENERGY GENERATION

(71) Applicant: Blue Laser Fusion, Inc., Palo Alto, CA (US)

(72) Inventors: Shuji Nakamura, Palo Alto, CA (US); Hiroaki Ohta, Palo Alto, CA (US)

(73) Assignee: Blue Laser Fusion, Inc., Palo Alto, CA (US)

( * ) Notice: Subject to any disclaimer, the term of this patent is extended or adjusted under 35 U.S.C. 154(b) by 348 days.

(21) Appl. No.: 18/161,717

(22) Filed: Jan. 30, 2023

(51) Int. Cl.
*G01B 15/00* (2006.01)
*G21B 1/15* (2006.01)
*G21B 1/23* (2006.01)

(52) U.S. Cl.
CPC .................................... *G21B 1/23* (2013.01); *G21B 1/15* (2013.01)

(58) Field of Classification Search
CPC ... G21B 1/23; G21B 1/15; G21B 1/03; G21B 1/19; G21B 1/05; G21B 1/052; G21B 1/17; G21B 3/006; G21B 1/13; G21B 1/00; G21B 1/057; G21B 1/21; G21B 3/00; G21B 1/11; G21B 1/01; G21B 1/25; G21B 1/055; G21B 3/002; G21B 3/008; G21B 3/004
See application file for complete search history.

(56) References Cited

U.S. PATENT DOCUMENTS 5,136,599 A * 8/1992 Wilcox ................. H01S 3/2383 372/18
5,168,400 A 12/1992 Moses
8,208,508 B2 6/2012 Deri et al.
9,171,646 B2 10/2015 Moses et al.
10,410,752 B2 9/2019 Hora
10,476,226 B2 11/2019 Bayramian et al.
10,660,192 B2 5/2020 Campbell et al.
11,387,007 B2 7/2022 Moses et al.
2003/0002610 A1 1/2003 Panarella
2009/0000268 A1 1/2009 Yurash
2011/0235669 A1 9/2011 Deri et al.
2011/0261919 A1 10/2011 Sefcik et al.
2013/0064340 A1 3/2013 Latkowski et al.
(Continued)

FOREIGN PATENT DOCUMENTS

WO 2011029031 A1 3/2011
WO 2012064767 A1 5/2012
(Continued)

OTHER PUBLICATIONS

Peter Russbueldt et al., "Innoslab Amplifiers", IEEE Journal of Selected Topics in Quantum Electronics, Jan./Feb. 2015, vol. 21, No. 1, pp. 447-463, Art No. 3100117, doi: 10.1109/JSTQE.2014.2333234.
(Continued)

*Primary Examiner* — Dani Fox
(74) *Attorney, Agent, or Firm* — Richard T. Ogawa; Ogawa P.C.

(57) ABSTRACT

A pulsed laser source device configured to a plurality of Fabry Perot resonant cavities. The pulsed laser source device provides a frequency, a wavelength, and a phase, each of which is matched with a plurality of laser beams configured, respectively, with the plurality of Fabry Perot resonant cavities to generate a high intensity beam for laser fusion.

20 Claims, 20 Drawing Sheets

(56) References Cited

U.S. PATENT DOCUMENTS

| | | | | |
|---|---|---|---|---|
| 2014/0138359 | A1 | 5/2014 | Carr et al. | |
| 2014/0233687 | A1* | 8/2014 | Jack | G21B 3/006<br>376/101 |
| 2014/0348283 | A1 | 11/2014 | Perkins et al. | |
| 2018/0211732 | A1 | 7/2018 | Perkins | |

FOREIGN PATENT DOCUMENTS

| | | | |
|---|---|---|---|
| WO | 2013070683 | A1 | 5/2013 |
| WO | 2013133885 | A1 | 9/2013 |
| WO | 2013165469 | A2 | 11/2013 |
| WO | 2014113100 | A2 | 7/2014 |
| WO | 2014130127 | A2 | 8/2014 |
| WO | 2014160128 | A1 | 10/2014 |
| WO | 2015021403 | A1 | 2/2015 |

OTHER PUBLICATIONS

Y. Hosaka et al., "Mode-locked pulse oscillation of a self-resonating enhancement optical cavity" Journal of Physics: Conference Series. 1350. 10.1088/1742-6596/1350/1/012028, Oct. 2016.

* cited by examiner

*Assuming simple math for cavity enhancement factor (loss to be considered in the actual case)*

Blue Laser Fusion Inc. Proprietary and Confidential

SYNCHRONIZED LIGHT SOURCE FOR LASER FUSION SYSTEM AND METHOD FOR ENERGY GENERATION

CROSS REFERENCE TO RELATED APPLICATIONS

This present application is related to U.S. Provisional Patent Application 63/424,779, filed on Nov. 11, 2022; DIRECT LASER FUSION SYSTEM AND METHOD FOR ENERGY GENERATION listed under U.S. Ser. No. 18/149,644 filed on Jan. 3, 2023; PELLET DISPENSER FOR LASER FUSION SYSTEM AND METHOD FOR ENERGY GENERATION listed under U.S. Ser. No. 18/157,515 filed Jan. 20, 2023, each of which is commonly assigned, and hereby incorporated by reference in its entirety for all purposes.

The present application is related to and being filed concurrently, including the subject application, with U.S. Ser. Nos. 18/161,717, 18/161,730, and 18/161,738, each of which is commonly assigned, and hereby incorporated by reference in its entirety for all purposes.

BACKGROUND OF INVENTION

The present invention relates generally to fusion energy generation techniques. In particular, the present invention provides a system and method for fusion energy using a high intensity pulse laser generation system, and related methods. More particularly, the present invention provides a a synchronized light source for laser fusion. Merely by way of example, the invention can be applied to a variety of applications, including energy generation for power, spaceships, travel, other vehicles for air, land, and water, defense applications (e.g., satellite, aerospace, land and missile defense, submarines, boats), biotechnology, chemical, mechanical, electrical, and communication and/or data applications.

From the beginning of time, human beings have developed energy sources from natural materials such as wood, coal, oil, and gas products. Unfortunately, burning wood and coal leads to major pollution issues, including adding undesirable carbon particles into the atmosphere. Oil and gas products also have similar limitations and have been a leading cause of “Global Warming.” Renewable energy sources including nuclear, wind, hydroelectric, and solar are promising. However, such renewable energy sources have other shortcomings. Wind only works if the wind is blowing. Solar cannot be used when the sun goes down. Hydroelectric is limited to areas with water, and nuclear, although promising, has had major problems in generating waste and unreliable and dangerous reactors. One other promising energy source has been fusion energy.

Fusion energy is a type of energy production that occurs when two atomic nuclei fuse together, releasing a large amount of energy in the process. It is considered a potential source of clean and abundant energy, as the fuel for fusion reactions (mainly hydrogen) is abundant on Earth and the reactions produce no greenhouse gases or other harmful pollutants.

There are two main approaches to achieving fusion reactions: inertial confinement fusion (ICF) and magnetic confinement fusion (MCF).

Inertial confinement fusion (ICF) involves using high-energy lasers or particle beams to compress and heat a small pellet of hydrogen fuel, causing it to fuse. The fuel is typically a mixture of deuterium and tritium, two isotopes of hydrogen. The fuel is contained within a small, spherical capsule called a hohlraum, which is placed at the center of a chamber filled with high-energy lasers or particle beams. When the lasers or particle beams are fired at the hohlraum, they create a uniform layer of x-rays that uniformly heat and compress the fuel inside the hohlraum. This causes the fuel to reach the necessary temperature and pressure conditions for fusion to occur The main advantage of ICF is that it can potentially produce fusion reactions with a relatively small amount of fuel and at a relatively low cost. However, the process is still in the experimental stage and there are significant technical challenges to before it can be considered a practical source of energy.

Magnetic confinement fusion (MCF) involves using strong magnetic fields to contain and heat a plasma (a hot, ionized gas) of hydrogen fuel, causing it to fuse. The most common type of MCF is called tokamak fusion, which uses a toroidal (doughnut-shaped) chamber to contain the plasma. The plasma is held in the center of the chamber by strong magnetic fields, which are created by running current through a set of coil windings around the chamber. The plasma is heated by injecting energy into it, either through particle beams or through electromagnetic waves.

The main advantage of MCF is that it has the potential to produce fusion reactions on a larger scale, making it more suitable for generating electricity. However, it is a more complex and costly process than ICF and there are still significant technical challenges to overcome before it can be considered a practical source of energy.

Both ICF and MCF have made significant progress in recent years and there are several experimental facilities around the world working on these technologies. However, achieving sustained fusion reactions with net energy production (meaning the energy produced by the fusion reactions is greater than the energy required to initiate and sustain the reactions) remains a major technical challenge.

There are also other approaches to fusion energy being explored, such as magnetized target fusion and muon-catalyzed fusion. However, these approaches are still in the early stages of development. It is not yet clear if fusion energy will be viable as a source of energy.

From the above, fusion energy has the potential to be a clean and abundant source of energy, but significant technical challenges must be overcome before it can be considered a practical source of energy.

SUMMARY OF INVENTION

According to the present invention, techniques related generally to fusion energy generation are provided. In particular, the present invention provides a system and method for fusion energy using a high intensity pulse or continuous wave (CW) laser generation system, and related methods. More particularly, the present invention provides a synchronized light source for laser fusion. Merely by way of example, the invention can be applied to a variety of applications, including energy generation for power, spaceships, travel, other vehicles for air, land, and water, defense applications (e.g., satellite, aerospace, land and missile defense, submarines, boats), biotechnology, chemical, mechanical, electrical, and communication and/or data applications.

In an example, the present invention provides a fusion system. The fusion system has a fusion reactor comprising a reaction region and a laser light source coupled to the fusion reactor. The laser light source has a single mode continuous wave (CW) laser source device, which is characterized by a power from 10 mW to 1 MW and configured to emit electromagnetic radiation as a first laser beam in a wavelength range of 300 nm to 1070 nm.

The light source has an electro-optic modulator (EOM) coupled to the single mode CW laser device and is configured to modulate a phase, a frequency, an amplitude, or a polarization of the first laser beam from the single mode CW laser light source. The light source has an acoustic optic modulator (AOM) or a semiconductor optical amplifier (SOA) coupled to the EOM and configured to output a pulsed laser beam. The source has a laser amplifier device coupled to the AOM or SOA and configured to amplify an intensity of a peak intensity of the pulsed laser beam characterized by a frequency ranging from 0.1 MHz to 5 MHz. The light source has optical elements (e.g., 1~3 optical elements in linear configuration) coupled to the laser amplifier device and configured to irradiate the pulse laser beam to a backside of one of a pair of mirrors. In an example, the optical elements include a collimator lens, a convex lens and others, which are lined up in series, not in parallel.

The system has a Fabry Perot resonant cavity, provided from a plurality of resonant cavities, and is derived from the irradiated pulse laser beam onto the back side of one of the mirrors. The resonant cavity is coupled to receive an amplified laser beam from the laser amplifier device through the collimator lens and is configured to be circulated between the pair of mirror devices for at least 10 to 100,000 cycles to cause the laser beam to increase in intensity from an initial intensity to a final intensity and resonate between the pair of mirror devices. Each of the resonant cavities is an optical enhancement cavity (OEC).

Each OEC is characterized by a cavity length with a cavity length fluctuation of less than $\pm 2\times(\lambda/2n)$, where $\lambda$ is an emission wavelength of a laser light source, n is a refractive index in the OEC.

In an example, the present invention provides a laser fusion system. The system has a reactor housing, which includes an interior region maintained in a vacuum or atmospheric pressure environment. The system has a reaction region within a vicinity of a spatially center region of the reactor housing. The system has a peripheral region formed within an interior of the reactor housing, the peripheral region surrounding the reactor region. A plurality of Fabry Perot cavity regions numbered from 1 through N are configured within the interior region of the reactor housing and spatially configured around the peripheral region. Each of the plurality of cavity regions extends from a first side of the peripheral region to a second side of the peripheral region. The first side opposes the second side. Each cavity region forms a linear path along a diameter of the interior region, such that the plurality of cavity regions forms a hub and spoke configuration such that each cavity region has a center region concentric with the reactor region and each cavity region has a first end coupled to the first side and a second end coupled to the second side of the peripheral region, where N is greater than 10.

The system has a pair of mirrors configured, respectively, on the first end and the second end of the cavity regions and a laser light source selected from a single mode pulse laser light source, a continuous wave (CW) laser light source or an amplifier configured to emit electromagnetic radiation coupled to at least one of the pair of mirror devices. A laser beam propagates from the laser light source between the pair of mirror devices to increase an energy intensity from a first intensity to a second intensity to an $M^{th}$ intensity for M cycles of the laser beam propagating between the pair of mirror devices, where M is greater than 1,000 cycles.

The system has a fuel pellet or container comprising fuel pellet inside disposed within the reactor region and coupled to the plurality of cavity regions as each of the plurality of cavity regions spatially intersect within the reactor region to provide an energy level sufficient to ignite the fuel pellet directly or indirectly for a fusion reaction. As used herein, the term directly means that laser beam is irradiated directly to the fuel pellet for a fusion reaction. The term indirectly means that the laser beam is irradiated inside of a container such as a hohlraum to generate the X-rays and, then the X-rays are irradiated to the fuel pellet for a fusion reaction.

In an example, the present invention provides a laser light source device coupled to a plurality of Fabry Perot resonant cavities to initiate laser fusion. The device has a continuous wave (CW) laser light source coupled with an electro-optic modulator (EOM) to modulate a phase, a frequency, an amplitude, or a polarization of a beam from the CW laser light source. The device has an acoustic optic modulator (AOM) or a semiconductor optical amplifier (SOA) coupled to the EOM to output a pulsed laser beam. The device has a laser amplifier device coupled to the AOM or SOA and configured to amplify an intensity of a peak intensity of the pulsed laser beam characterized by a frequency ranging from 0.1 MHz to 5 MHz. The device has a collimator lens coupled to the laser amplifier device to uniformly irradiate the pulse laser beam to a backside of one of a pair of the mirrors. A Fabry Perot resonant cavity, provided from the plurality of resonant cavities, is derived from the uniformly irradiated pulse laser beam onto the back side of one of the mirrors. The resonant cavity is coupled to receive an amplified laser beam from an output of the laser amplifier device through the collimator lens and configured to be circulated between the pair of mirror devices for at least 10 to 100,000 cycles to cause the laser beam to increase in intensity from an initial intensity to a final intensity and resonate between the pair of mirror devices.

In an example, the present invention provides a single pulsed laser configured to provide a plurality of laser beams, each of which has matched characteristics, including frequency, period, wavelength, and others, to generate a high intensity pulse laser for a fusion reaction.

Of course, one of ordinary skill in the art would recognize other variations, modifications, and alternatives.

Depending upon the example, the present invention can achieve one or more of these benefits and/or advantages. In an example, the present invention provides a fusion energy system including a high intensity pulse or CW laser system configured with a reactor in a compact and spatially efficient system and related methods. In an example, the high intensity pulse or CW laser system provides enough energy to ignite and sustain fusion energy within the reactor. In an example, the present invention offers advantages of generating fusion power through an efficient size, weight, and cost using the present high intensity lasers. These and other benefits and/or advantages are achievable with the present device and related methods. Further details of these benefits and/or advantages can be found throughout the present specification and more particularly below.

A further understanding of the nature and advantages of the invention may be realized by reference to the latter portions of the specification and attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE EXAMPLES

In an example, according to the present invention, techniques related generally to fusion energy generation are provided. In particular, the present invention provides a system and method for fusion energy using a high intensity pulse or CW laser generation system, and related methods. More particularly, the present invention provides a synchronized light source for laser fusion. Merely by way of example, the invention can be applied to a variety of applications, including energy generation for power, spaceships, travel, other vehicles for air, land, and water, defense applications (e.g., satellite, aerospace, land and missile defense, submarines, boats), biotechnology, chemical, mechanical, electrical, and communication and/or data applications.

Figure 1:
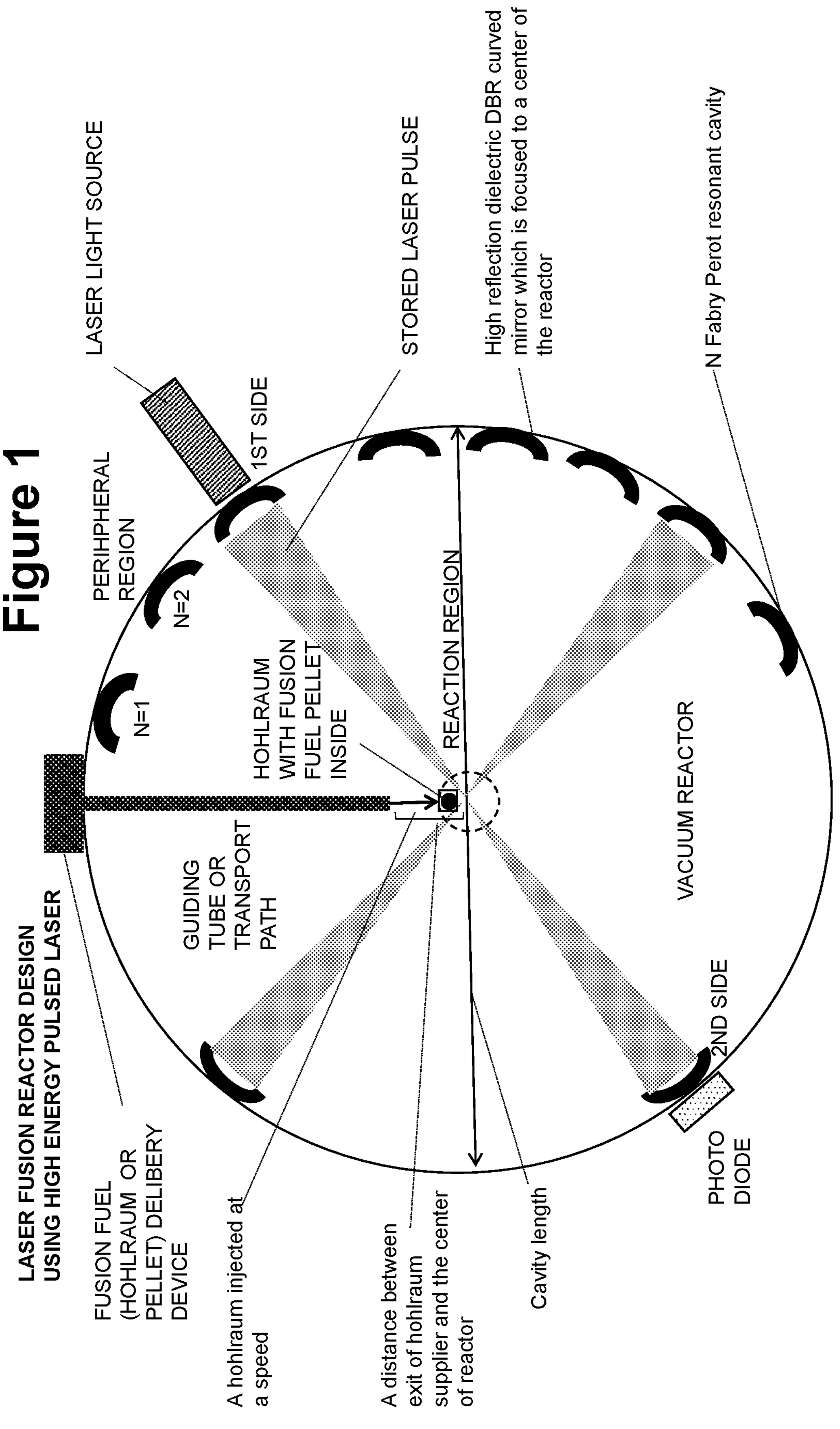
FIG. 1 is a simplified diagram of a laser fusion system according to an example of the present invention.

FIG. 1 is a simplified diagram of a laser fusion system according to an example of the present invention. As shown, the system has a plurality or N Fabry Perot resonant cavities, each of which is defined between a pair of mirror devices opposing each other in an example, The cavities are configured in a reactor housing. The reactor housing is maintained in a vacuum environment. Each cavity has a laser light source coupled to one end and a photo diode (or detector) coupled to the other end. Each of the cavities intersect in a center region to form a hub and spoke configuration. In an example, the system has a fuel pellet or hohlraum supply (or delivery) device, as shown. Each of the laser light sources is synchronized for a high-power pulsed laser to interact (or hit) the fuel pellet in a reaction region or center of a reactor housing. A sensing system, such as LIDAR (e.g., light detection and ranging) and video camera, can be used in conjunction with the laser light sources to synchronize delivering the high-power pulsed laser to the fuel pellet to initiate a fusion reaction. Further details of the present system can be found throughout the present specification and more particularly below.

Figure 2:
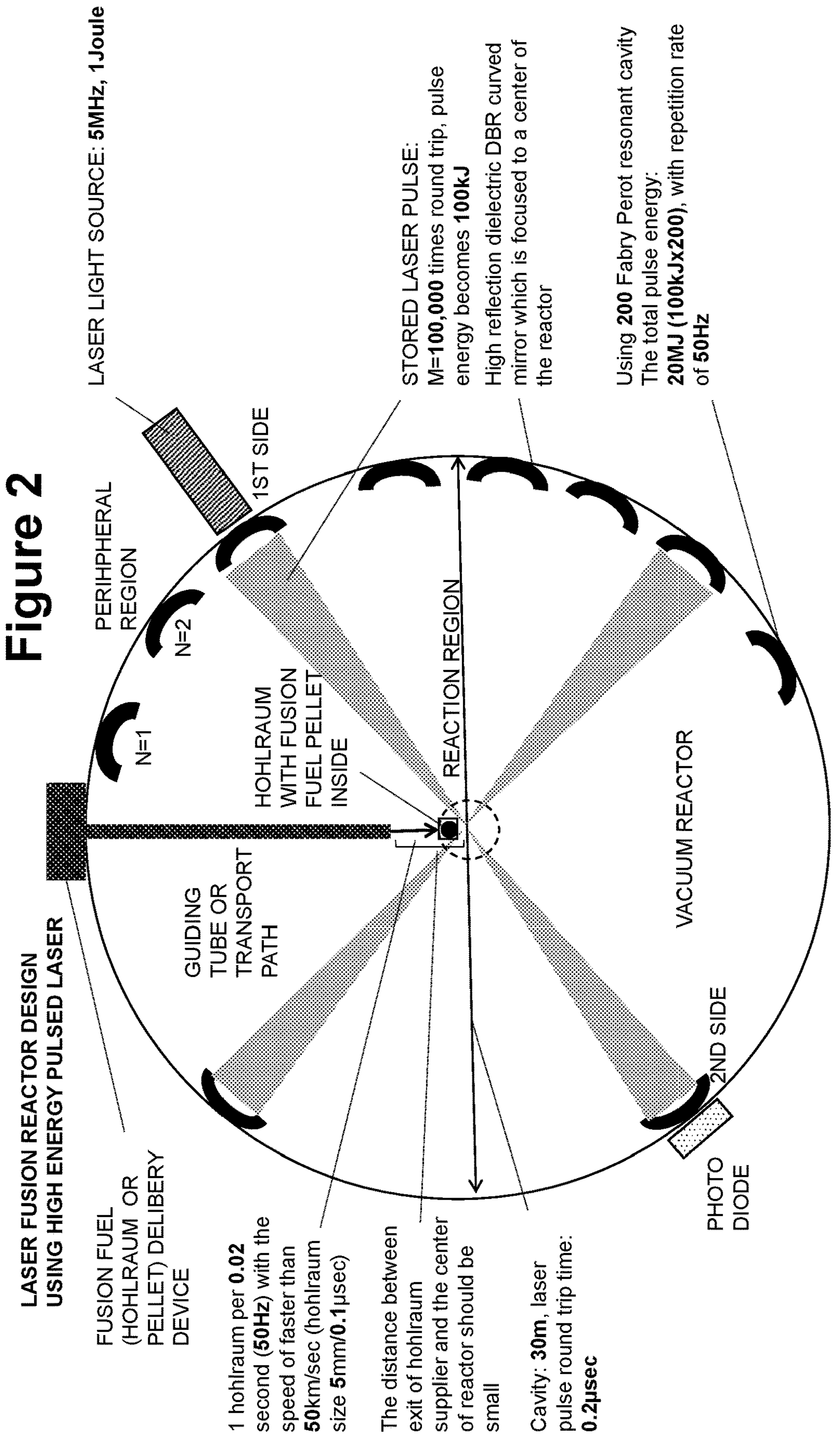
FIG. 2 is a simplified diagram of a laser fusion system of a cavity length of 30 m, and a high-power pulse laser of 100 kJ with a frequency of 50 Hz according to an example of the present invention.

FIG. 2 is a simplified diagram of a laser fusion system according to an example of the present invention. The system has a cavity length of 30 meters and uses a light source configured for 5 MHz and 1 Joule. As shown, the system has a reactor housing, which includes an interior region maintained in a vacuum environment, a plurality of cavities, each of which is formed between a pair of mirrors. Each pair of mirrors has a laser light source on one end and a photodetector on the other end. The system has a pellet supply (or delivery) device or hohlraum supply (or delivery) device, as shown.

In an example, the reactor housing is a vacuum chamber. In an example, a vacuum chamber is a sealed, airtight container that is used to create a vacuum, or a region with a very low pressure. Inside of the cavity is evacuated (or empty), which is a desired condition to increase the intensity of pulse or CW laser power. In an example, when air or another impurity is in the cavity, particles and waters in the air absorb or scatter the laser light, and the intensity of the laser light is decreased when laser light is propagating in the cavity. In a preferred example, the cavity is maintained in a vacuum.

The vacuum chamber is typically made of a material that is resistant to vacuum, high temperatures, and radiation, such as stainless steel, aluminum or other materials. It is designed to withstand the high radiation and high temperatures that are generated during the fusion reaction, as well as the intense radiation emitted by the fusion products.

In an example, the vacuum chamber is a component of a fusion reactor, as it helps to create the conditions that are necessary for the laser power to increase in the present invention. It also helps to protect the fusion reaction from external influences, such as air and other contaminants, which can interfere with the reaction as well as laser propagation. In an example, the vacuum environment can range from less than $10^{-5}$ torr to $10^{-3}$ torr. Of course, there can be other variations, modifications, and alternatives.

A laser light source configured to emit electromagnetic radiation coupled to at least one of the pair of mirror devices such that a laser beam propagating from the laser light source between the pair of mirror devices increases in energy intensity from a first intensity to a second intensity to an Mth intensity for M cycles of the laser beam propagating between the pair of mirror devices, where M is greater than 1,000 cycles.

To create the vacuum in the reactor housing, the vacuum chamber is evacuated using a high-capacity pump, which removes all of the air and other gases from the chamber. This process is known as pumping down the chamber, and it typically takes several hours or much more depending on the size of chambers to achieve the desired vacuum level. Once the vacuum has been achieved, the laser light source(s) is switched on, and pulse or CW laser power is increased in each cavity with a total number of N. The fuel pellet or the container which include the fuel pellet is injected through the tube, and the fusion reaction can begin. As shown, a number of N pairs of Fabry-Perot cavities intensify the pulse laser or CW laser inside of the reactor housing in the present invention.

In an example, the system has a reaction region within a vicinity of a spatially center region of the reactor housing. The reaction region is within the center region, as shown. The center region shows an intersection between a plurality of cavity regions.

The system has a peripheral region formed within an interior of the reactor housing as shown. The peripheral region surrounds the reactor region, and is preferably disposed along a largest diameter of the interior of the reactor housing. As shown, the system has a plurality of cavity regions numbered from 1 through N within the interior region of the reactor housing and spatially configured around the peripheral region such that each of the plurality of cavity regions extends from a first side of the peripheral region to a second side of the peripheral region. Preferably, the first side is opposing the second side along a straight line, and forms a linear path along a diameter of the interior region. In an example, the plurality of cavity regions forms a hub and spoke configuration. Each cavity region has a center region concentric with the reactor region and each cavity region has a first end coupled to the first side and a second end coupled to the second side of the peripheral region. In an example, N is greater than 10 and can be 100, 200, or thousands, although there may be fewer cavities in other examples. Each and every laser light source is synchronized with other, the fuel pellet delivery system, and photo detectors, for high power pulsed laser to hit the fuel pellet or the container in the reaction region.

As shown, a pair of mirrors are configured, respectively, on the first end and the second end of the cavity regions. Each pair of mirrors are spatially disposed along the peripheral region within the reactor housing. As shown, the system uses any combination of high reflection flat and curved optical mirror devices with a reflectivity of more than 99.99% or 99.999% to minimize an optical loss. In an example, a high reflection optical mirror is a device that reflects light in a specific direction. The device has a flat or curved surface, coated with a high reflective material, such as dielectric materials. The preferred high reflection optical mirror is a dielectric distributed Brag Reflector (DBR). In an example, the shape and curvature of the mirror determine the direction and intensity of the reflected light.

In the present invention, all of the high intensity laser beams are focused to a small spot in the center of the reactor or the reaction region to achieve a highest laser power density at the center by gathering all of a number of N high intensity laser beams after multiplying laser intensity M times at each cavity. At each cavity composed of a pair of mirrors, a laser light source configured to emit electromagnetic radiation coupled to at least one of the pair of mirror devices such that a laser beam propagating from the laser light source between the pair of mirror devices increases in energy intensity from a first intensity to a second intensity to an $M^{th}$ intensity for M cycles of the laser beam propagating between the pair of mirror devices.

In an example, a laser light source configured to emit electromagnetic radiation and form a high-power laser beams through each Fabry Perot cavity of inside of the reactor. In an example, the present system couples a high-power pulse or CW laser system to a fusion reactor to create a high-power energy source to initiate and perpetuate a fusion reaction. As an example, laser fusion is a process in which energy is generated through the fusion of atomic nuclei. The process occurs when the nuclei of two or more atoms are brought together and collide at high temperatures and high pressures, causing them to fuse together and release a large amount of energy. In the laser fusion process in an example, a high-energy laser beam is used to compress and heat a small pellet of fuel, typically a mixture of deuterium and tritium (two isotopes of hydrogen). The laser beam creates a shockwave that compresses the fuel by implosion, causing it to reach temperatures and pressures high enough for fusion to occur. During the fusion process, the atomic nuclei of the fuel atoms combine to form a heavier nucleus, releasing a large amount of energy in the form of light, momentum and heat. This energy can then be harnessed and used to generate electricity through the use of an electric generator, as noted. Further details of the present fusion system, and in particularly a high-power laser are provided throughout the present specification and more particularly below.

As an example, a high-power laser is a device that produces a highly concentrated and focused beam of light with a high level of power. The light produced by a high-power laser can have a variety of properties, such as wavelength, intensity, and coherence, which depend on the specific design and construction of the laser.

One type of high-power laser is the solid-state laser, which is made of a solid gain medium that is pumped by an external energy source, such as a flashlamp or another laser. The gain medium is typically a crystal, ceramics or glass rod that is doped with a rare earth element, such as neodymium or ytterbium, to amplify the laser beam. Solid-state lasers are highly efficient and can produce high power outputs, making them ideal for many industrial and scientific applications.

Another type of high-power laser is the gas laser, which uses a gas as the gain medium. Gas lasers can be further classified based on the type of gas used, such as helium-neon lasers, carbon dioxide lasers, and argon lasers. Gas lasers are highly reliable and have a long lifespan, making them suitable for continuous operation.

A high-power laser can also be a hybrid of the two aforementioned types, such as a fiber laser, which uses a doped fiber as the gain medium. Fiber lasers are highly efficient and can produce very high-power outputs, making them ideal for many industrial and scientific applications.

There are many factors that contribute to the performance and efficiency of a high-power laser, such as the gain medium, pump source, resonator design, and cooling system. The design and construction of a high-power laser can greatly impact its performance and suitability for a specific application. As an example, a high-power laser is a highly concentrated and focused beam of light with a high level of power, used in a wide range of applications.

In an example, the present invention provides a high intensity pulse or CW laser generation system. In an example, a high intensity pulse or CW laser is a type of laser that produces a highly concentrated and focused beam of light with a high level of power. The short pulse duration of a high intensity pulse laser allows for high peak power and the ability to deliver the high peak energy to a target in a very short period of time.

In an example, one type of high intensity pulse laser is the Q-switched laser, which uses a mechanical or electro-optical modulator to rapidly switch the laser beam on and off. This allows the laser to produce very short pulses, with pulse durations ranging from nanoseconds to picoseconds. Q-switched lasers are highly efficient and can produce very high peak powers, making them ideal for many industrial and scientific applications. Another type of high intensity pulse laser is the mode-locked laser, which uses a nonlinear optical element, such as a saturable absorber or a passive mode locker, to generate short pulses. Mode-locked lasers can produce very short pulses, with pulse durations ranging from femtoseconds to picoseconds. They are highly stable and can produce very high peak powers, making them ideal for many scientific and research applications.

There are many factors that contribute to the performance and efficiency of a high intensity pulse or CW laser, such as the gain medium, pump source, resonator design, and pulse generation method. The design and construction of a high intensity pulse or CW laser can greatly impact its performance and suitability for a specific application. In an example, a high intensity pulse laser is a type of laser that produces a highly concentrated and focused beam of light with a high level of power and a very short pulse duration. It is used in a wide range of applications. In an example, the present invention provides a high intensity pulse or CW laser generation system and related methods as described throughout the present specification and more specifically below.

As shown, the laser light source is coupled to at least one of the pair of mirror devices such that a laser beam propagating from the laser light source between the pair of mirror devices to increase energy intensity from a first intensity to a second intensity to an MW intensity for M cycles of the laser beam propagating between the pair of mirror devices. In an example, M is greater than 1,000 cycles, although there may be fewer or more.

As shown, there are several types of high reflection optical mirrors, each with specific properties and uses. Flat mirrors, also known as plane mirrors, have a flat reflecting surface and are used to reflect light in a straight line. In an example, concave mirrors have a curved inward reflecting surface and are used to focus light to a single point. In the present invention, concave mirrors are included to focus the high-power laser into a center of reactor. In an example, convex mirrors have a curved outward reflecting surface and are used to spread out light over a wider area to reduce the concentration of the laser power at the mirror surface and to avoid optical damage. In an example, optical mirrors can also be coated with specialized coatings, such as dielectric coatings or metallic coatings, to enhance their reflective properties and reduce surface defects, which causes optical absorption resulting in optical damages. These coatings can improve the efficiency and performance of the mirror, making it suitable for a specific application.

In an example, the system has a fuel pellet or a container comprising the fuel pellet inside disposed within the reactor region and is coupled to the plurality of cavity regions as each of the plurality of cavity regions spatially intersect within the reactor region to provide an energy level sufficient to ignite the fuel pellet for a fusion reaction. A tube or other fuel supply guiding component is configured from the fuel pellet or the container supply device to the reaction region. In an example, the container is a hohlraum, which will be described in more detail below.

In an example, the position of pellet or container is monitored by LIDAR and video camera and, feed back to the computer to synchronize with all of the laser light source, signals of photodiode located at backside of mirror, and the fuel pellet or the container delivery device.

In an example, the present system uses a plurality of high energy pulsed or CW lasers configured in the vacuum chamber to achieve a total of 1 Mega Joule (MJ)~20 MJ, 10 Tera Watt (TW)~10 Peta Watt (PW), or more energy. The cavity length can be 20 meters~10 K meters, but can be smaller or larger in other examples. The frequency of pellet or container delivery into the reaction region can be about 1 Hz~50 Hz and more or less in an example. The laser light source can each have a power of 0.01 Joule~100 J, and a frequency of 100 KHz~100 Mega Hertz.

Figure 3:
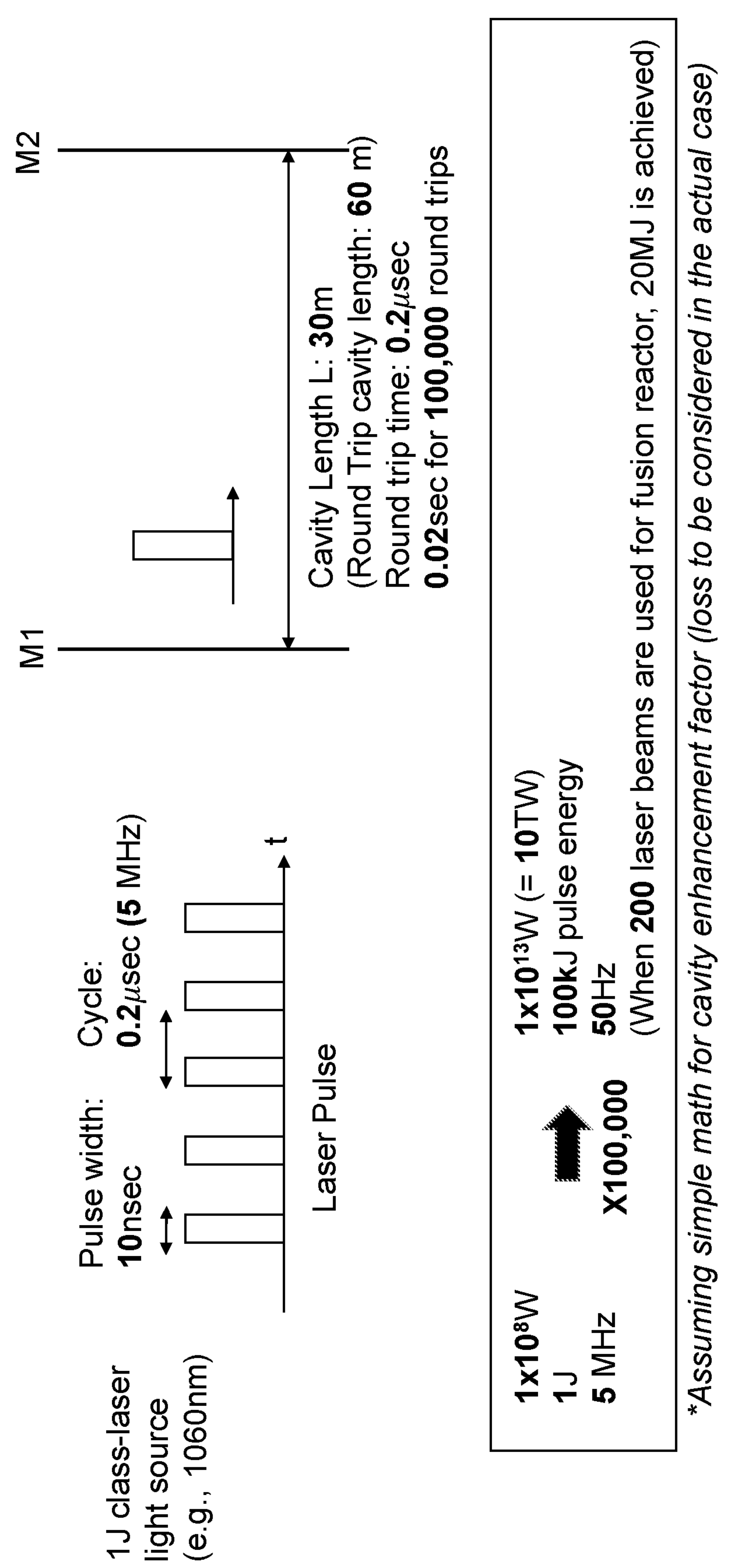
FIG. 3 illustrates simplified timing diagrams of a laser fusion system of FIG. 2 showing a cavity length of 30 m, and a high-power pulse laser of 100 kJ with a frequency of 50 Hz according to an example of the present invention.

For a 30-meter cavity length referring to the FIGS. 2 and 3, the round-trip time is 0.2 micro-seconds for a laser beam. The laser light source becomes with a frequency of 5 MHz (=1/(0.2 micro-seconds)). When pulse energy of the laser light source is 1 Joule, after the laser beam propagating between each pair of mirrors 100,000 times, a total energy of 100 Kilo Joules is ideally achieved in the cavity region with repletion rate of 50 Hz assuming mirror loss is ignored as shown. For 200 pairs of mirrors or cavities, we achieve a total energy of 20 Mega Joules at the reaction region. The repetition rate of high-power pulse of 20 Mega Joules becomes 50 Hz.

In an example, the tube has an opening or output within a vicinity of the reaction region. In an example, the fuel pellet or hohlraum has to be supplied to the center of the reactor region with a repetition rate of 50 Hz, which is synchronized with the frequency of 50 Hz of high-power pulse of all of the cavities to generate a fusion reaction. In an example, the distance between the opening to the reaction region ranges from 0.01 mm to 1 m and is preferably 0.01 mm to 20 mm.

In an example, the distance is the smaller between the opening to the reaction region to keep the hohlraum within a spatial profile to be balanced without tilting. In an example, the shape of inside of tube has configured to fit the shape of hohlraum to guide the hohlraum into the opening by keeping the same spatial profile and balance. Through the opening of the tube, the hohlraum is injected to the center region or reactor region of the reactor by keeping the balance without any tilt such that all of high-power laser beams targeted to both opening of hohlraum are irradiated to the surface of inside of hohlraum to generate X-rays through both opening of hohlraum as further described below. If the distance becomes larger, the balance or spatial profile of hohlraum is broken and tilted and, the high-power laser beams are not irradiated through both opening of hohlraum as described further. A pellet or hohlraum is sucked to the reaction region at high speed from a difference in pressure between the tube opening region and the fuel pellet delivery device or hohlraum delivery device in an example.

In an example using a hohlraum, when the hohlraum with diameter of 5 mm initiates contact the Fabry Perot cavity at an intersection where all of the high-power lasers are focused into a small spot at the center or reaction region of the reactor, a speed of 50 kilometers/second is desired. For a 30-meter cavity length, the round-trip time of the laser beam is 0.2 micro-seconds. When the hohlraum cross at the center of the cavity, a subsequent laser beam pulse is coming in 0.1 micro-seconds. Before the next pulse laser is achieved, the hohlraum passes though the cavity. Accordingly, a speed of more than 50 kilometers/second (5 mm/0.1 microseconds=50 km/second) is desired.

In another example, a fuel pellet is injected from the tube as a fuel to generate a direct fusion reaction (without X-ray irradiation from the hohlraum), the speed of the pellet is more than 10 kilometers/second (1 mm/0.1 microseconds=10 km/second). Thus, a high energy pulse of 100 kilo Joule with a frequency of 50 Hz with the cavity length of 30 meters is illustrated.

In an example, the high speed of the hohlraum or the pellet can range from 0.5 kilometers per second to 60 kilometers per second, but is preferably range of 2~50 kilometers per second depending of the size of hohlraum or pellet which cross the Fabry Perot cavity at the center of the reactor. The high speed can range less than 1 kilometer per second if the cavity length is more than 1.5 km and the roundtrip time is more than 10 micro-second. Of course, one of ordinary skill in the art would recognize other variations, modifications, and alternatives.

Figure 4:
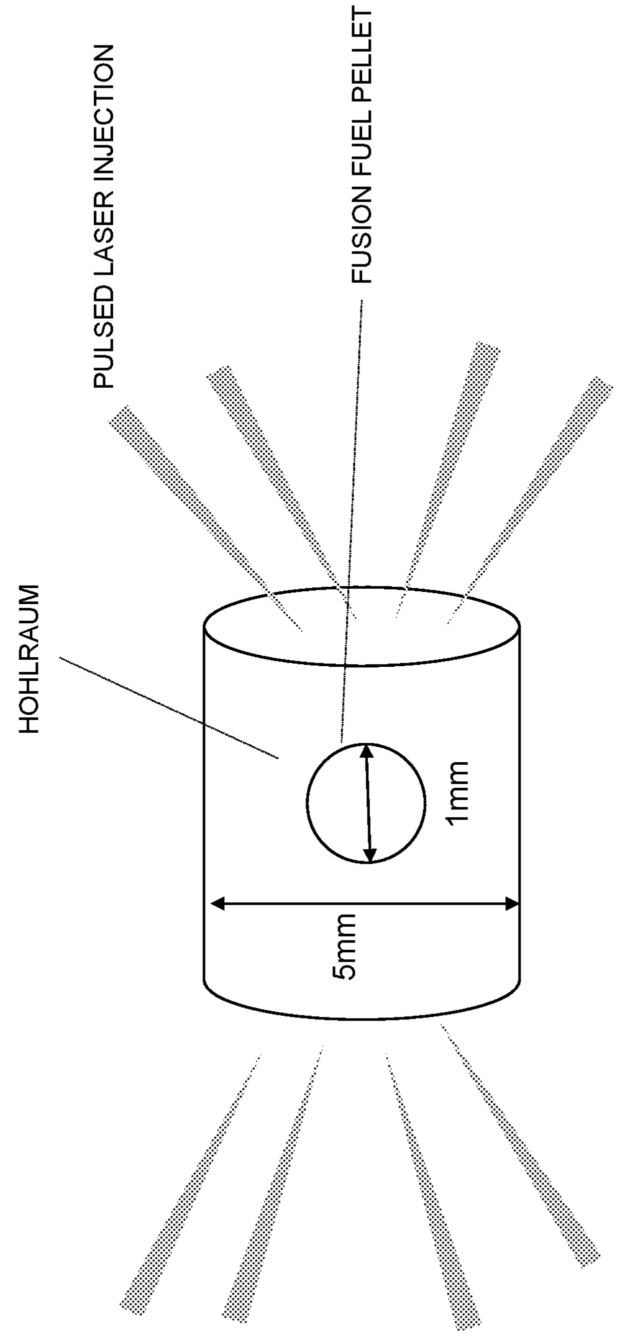
FIG. 4 is a simplified diagram of a hohlraum device according to an example of the present invention.

FIG. 4 is a simplified diagram of a hohlraum device according to an example of the present invention. As shown, the hohlraum device encloses the fuel pellet inside. In an example, a hohlraum is a hollow, cylindrical cavity that is used as a radiation or energy source in a fusion reactor. It is typically made of a high-Z material, such as gold or tungsten, which absorbs and re-emits high-energy photons, such as x-rays. The hohlraum is used to create conditions that generate a fusion, such as high temperatures and pressures, by irradiating the interior with high-power lasers to generate X-rays and irradiating fuel pellet cell by X-rays. This process is known as indirect-drive fusion, and it is typically used in inertial confinement fusion (ICF) systems.

In an ICF fusion reactor, the hohlraum contain a fuel capsule inside which contains such as deuterium and tritium. When the inside wall of hohlraum is irradiated with high-energy photons (high-power lasers) as shown, X-rays are generated by irradiation of high energy lasers, and then the fuel capsule is heated to the point where the deuterium and tritium nuclei fuse together, releasing a large amount of energy in the process. The energy released by the fusion reaction is then used to generate electricity, which can be used to power homes and businesses. Instead of deuterium and tritium, other low-Z martials, e.g., helium, lithium, and boron etc. can be applied.

The design of the hohlraum is important to the success of the fusion reaction, as it determines the conditions under which the fuel capsule is irradiated. Factors such as the size and shape of the hohlraum, the materials used to construct it, and the intensity and duration of the photon irradiation must be carefully considered to achieve the desired fusion conditions.

The hohlraum can be surrounded by conducting coil, which generates magnetic field to enhance high density and temperature plasma confinement during implosion.

The fuel pellet cell can be imploded to ignite the nuclear fusion reaction without hohlraum if the laser-induced implosion pressure is enough high to suppress variety of instabilities during implosion. This process is known as direct-drive fusion.

The hohlraum three-dimensional design have a various type of cylindrical, spherical, and hemisphere, which has aperture to receive high power pulse lasers.

Using 30 m cavity length and the same size of reactor, high power pulse laser of 100 kJ with a frequency of 50 Hz is achieved as described. For other applications, 10 Hz is desired for continuous laser fusion to supply enough energy continuously. Further details of examples of the present invention can be found throughout the present specification and more particularly below.

Figure 5:
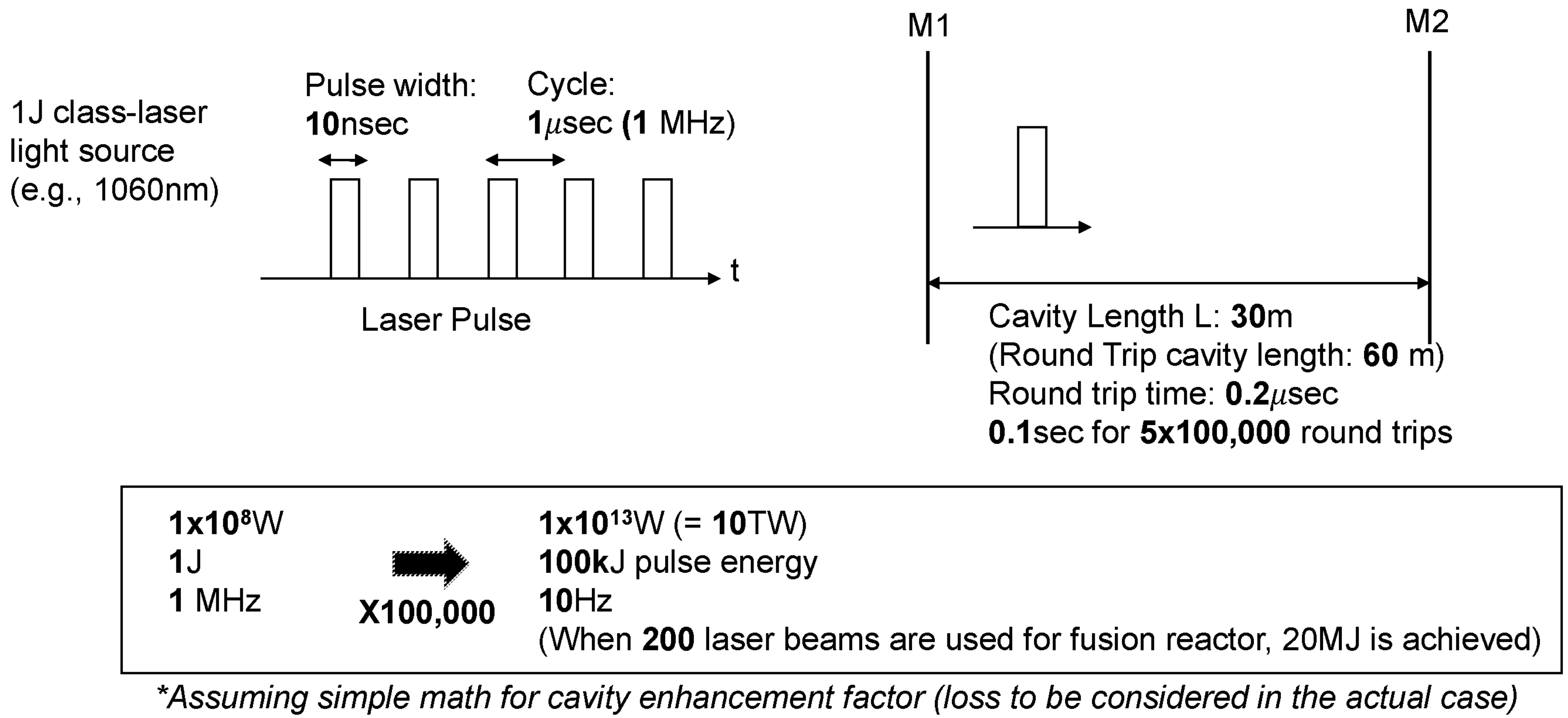
FIG. 5 illustrates simplified timing diagrams of a laser fusion system of FIG. 2 showing a cavity length of 30 m, and a high-power pulse laser of 100 kJ with a frequency of 10 Hz according to an example of the present invention.

Referring to FIG. 5, we demonstrate a high-power pulse laser with the frequency of 10 Hz using a short cavity of 30 meters. As the laser light source, the frequency of 1 MHz (pulse repletion rate of 0.1 micro-second) and the pulse energy of 1 Joule is included. A round-trip time of 30-meter cavity is 0.2 micro-seconds. Every five-round trip, the pulse energy in the cavity is increased from the first intensity to a second intensity to an Mth intensity for 5M cycles of the laser beam propagating between the pair of mirror devices. By a total of 500,000 times round trip, an input pulse energy of 1 Joule becomes 100 kilo Joules as shown.

Figure 6:
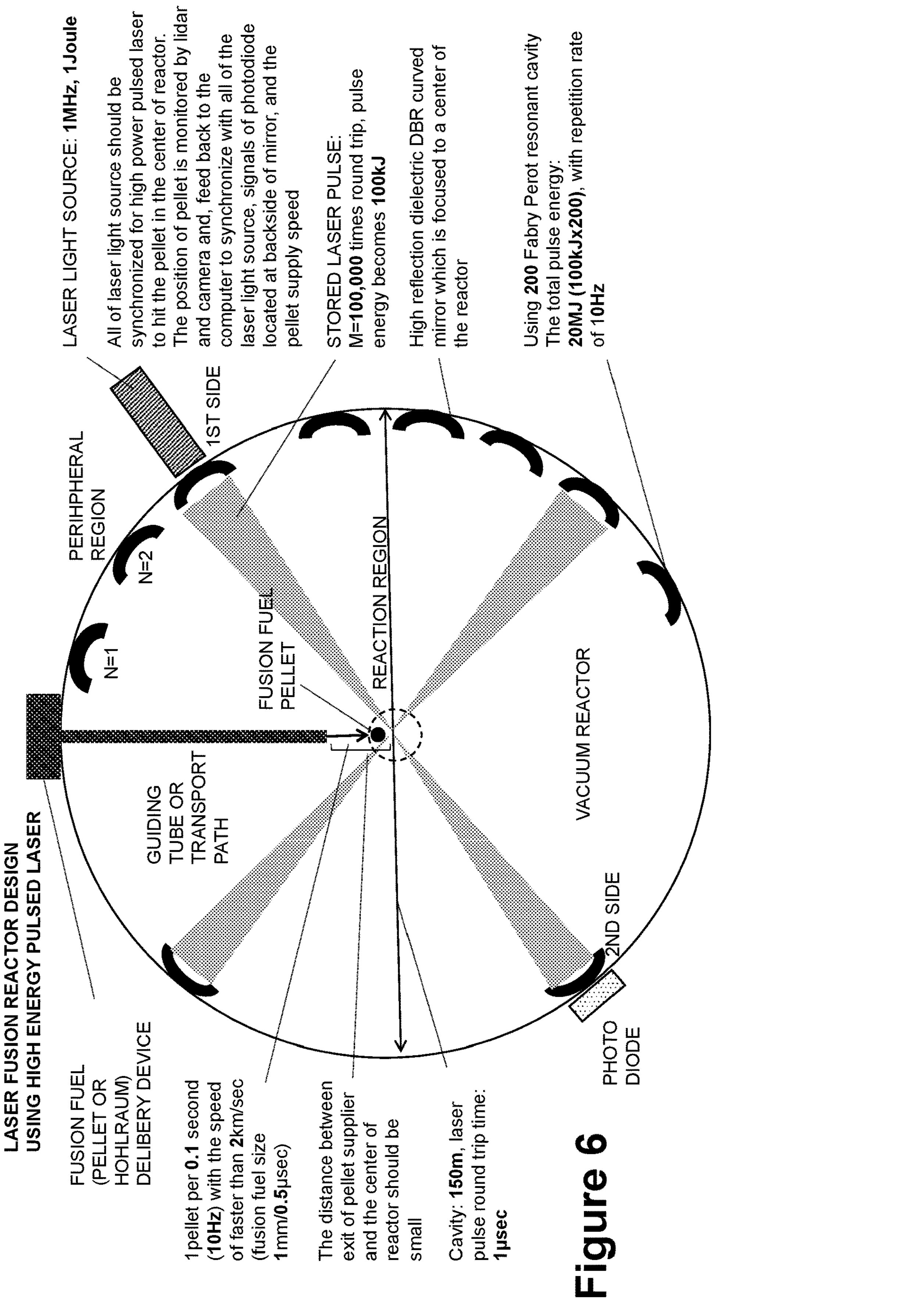
FIG. 6 is a simplified diagram of a laser fusion system of a cavity length of 150 m, and high-power pulse laser of 100 kJ with a frequency of 10 Hz according to an example of the present invention.
Figure 7:
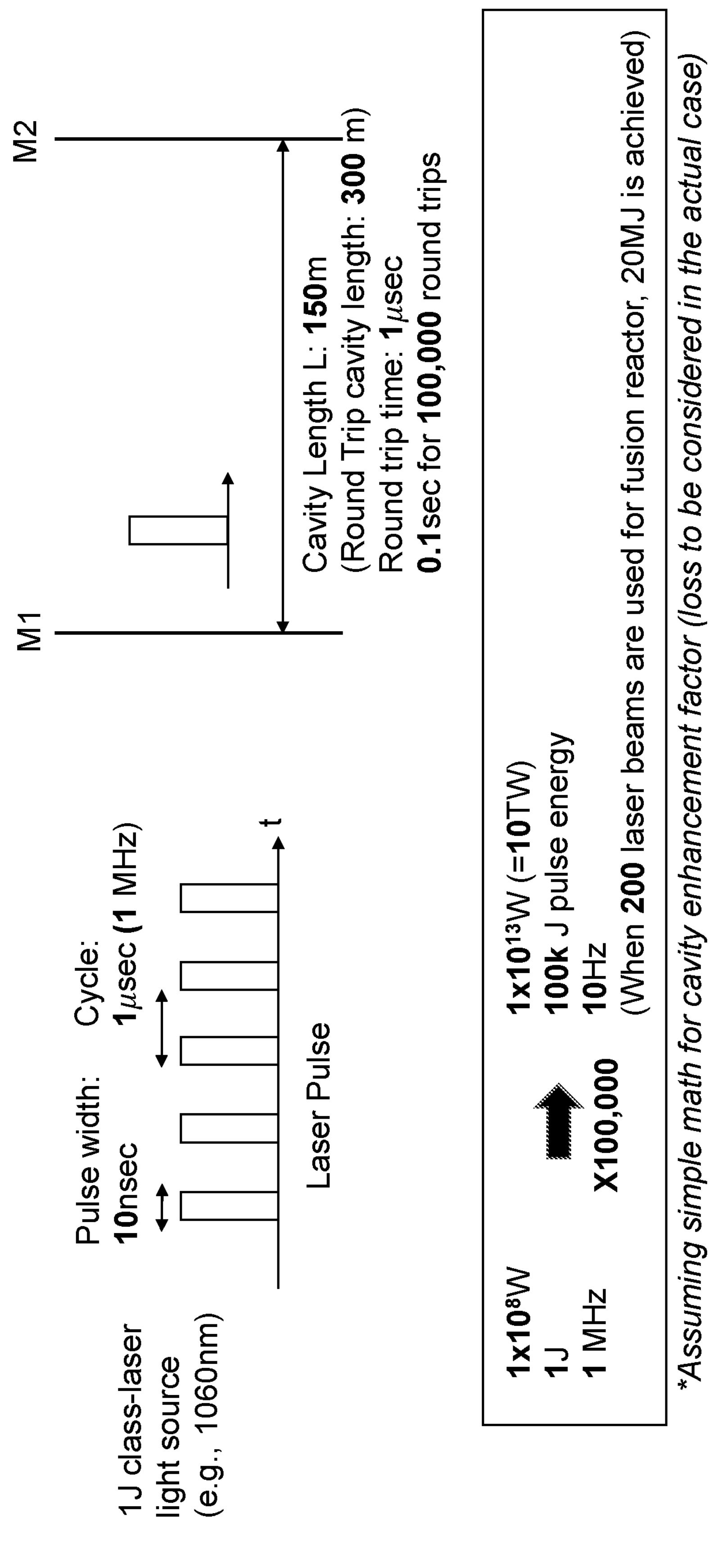
FIG. 7 illustrates simplified timing diagrams of a laser fusion system of FIG. 6 showing a cavity length of 150 m, and a high-power pulse laser of 100 kJ with a frequency of 10 Hz according to an example of the present invention.

FIGS. 6 and 7 illustrate a high-power pulse laser with 10 Hz repletion rate by 100,000 round-trip. As discussed, the 30-meter cavity requires 500,000 round trip to achieve the high-power pulse of 100 kJ with the frequency of 10 Hz from the laser light source of 1 Joule. An additional 400,000 round trip contributes to increase the loss from the cavity. As shown, a high power pulse laser with the repetition frequency of 10 hz by 100,000 times round-trip is achieved using 150 meter cavity length.

For the 150-meter cavity length, the round-trip time is 1 micro-seconds for a laser beam. The laser light source has a frequency of 1 MHz (=1/(1 micro-second)). When pulse energy of the laser light source is 1 Joule, after the laser beam propagating between each pair of mirrors 100,000 times, a total energy of 100 Kilo Joules is achieved (ideally) in the cavity region with repetition rate of 10 Hz assuming mirror loss is ignored. Using 200 pairs of mirrors or cavities, the present system achieves a total energy of 20 Mega Joules at the reaction region. The repetition rate of high-power pulse of 100 Kilo Joule is 10 Hz.

As shown in an example, a one (1) Joule class laser source is included. The laser source is configured for, for example, 1060 nm but can be other wavelengths such as 530 nm and 350 nm. The laser pulse has a length of ten (10) nanoseconds or 1-10 nanoseconds. The cycle is 1 micro-second (or 1 MHz). In an example, one hundred thousand (100,000) cycles or round trips are generating a high-power laser pulse of 100 kilo Joule in a cavity according to the present invention. The cavity length is, for example, one hundred fifty (150) meters equating to a round trip cavity length of three hundred (300) meters. The round-trip time is 1 micro-second, and 0.1 of a second creates one hundred thousand round trips. For the one hundred thousand round trips, we generate $1\times10^{13}$ Watts (or 10 Terra Watt) or one hundred (100) Kilo Joules of pulse energy at ten (10) Hz as shown in FIG. 6. When two hundred laser beams are used together for a fusion reactor, twenty (20) Mega Joule is achieved. For continuous laser fusion or commercially available laser fusion to supply enough electricity continuously, a Mega Joule pulse is required at 10 Hz repetition rate in an example. Using present invention, it is possible to make the Mega Joule pulse with the repetition rate of 10 Hz by using the present system and methods. Presently, Lawrence Livermore National laboratory could generate only one pulse with a Mega Joule energy per day.

In an example, the tube has an opening or output within a vicinity of the reaction region. The fuel pellet or hohlraum is supplied to the center or reaction region of the reactor with a repetition rate of 10 Hz, which is synchronized with the frequency of 10 Hz of high-power pulse by concentrating all of high-power lasers from each cavity to the center of reactor to generate a fusion reaction. In an example, the distance between the tube opening to the reaction region ranges from 0.01 mm to 1 m and is preferably 0.01 mm to 20 mm. The distance is the smaller to maintain the hohlraum in a spatial configuration (orientation) and balance without tilting. The shape of inside of tube is configured to fit the shape of hohlraum to maintain a spatial orientation and balance of the hohlraum during the process of guiding the hohlraum inside of tube. The hohlraum is dispensed through the opening of the tube and the hohlraum is injected to the center region of the reactor by maintaining the spatial orientation and balance without any tilt such that all of the high-power laser beams targeted to the hohlraum are irradiated to the surface of inside of hohlraum to generate X-rays through both of openings of the hohlraum. If the distance from the opening to the reaction region becomes undesirably larger, the balance of hohlraum is not maintained and tilted and, the high-power laser beams are not irradiated uniformly through both of openings of hohlraum, which lead to reduce the X-ray generation rate and not to generate a fusion reaction from the fuel pellet cell.

In an example, the pellet or hohlraum is dispensed (or sucked) into the reaction region at a high speed from a difference in pressure between the tube opening region and the fuel pellet delivery device or hohlraum delivery device. The pellet or hohlraum is placed in and connected to the tube inside of the delivery or supply device at an atmospheric pressure. The delivery or supply device is placed outside of reactor at atmospheric pressure. The gate or valve in the tube which is separated between the vacuum in the reaction region and atmospheric pressure is opened, and the fuel pellet or hohlraum is transferred via suction into the reaction region at a high speed.

In an example, when the hohlraum with diameter of 5 mm, interacts with the the Fabry Perot cavity at the intersection of all of the high-power lasers focused into a small spot at the center of the reactor, a speed of 10 kilometers/second is desired. For a 150-meter cavity length, the round-trip time of the laser beam is 1 microsecond. When the hohlraum cross at the middle of the cavity, a subsequent laser beam is coming within 0.5 micro-seconds. Before next pulse laser, the hohlraum has to pass though the cavity region. A hohlraum speed of more than 10 kilometers/second (5 mm/0.5 microseconds=10 km/second) is desired.

In another example, the fuel pellet is injected from the tube as a fuel to generate the direct fusion reaction using the high-power lasers without X-rays from the hohlraum, the speed of pellet is more than 2 kilometers/second (1 mm/0.5 microseconds=2 kilometers/second). A high energy pulse of 100 kilo Joules with a frequency of 10 Hz with the cavity length of 150 m is achieved. In an example, the high speed of hohlraum or pellet can range from 2 kilometers per second to 10 kilometers per second, but is preferably more than 2~10 kilometers per second depending on size (diameter) of hohlraum or pellet which intersects the Fabry Perot cavity at the center or reaction region of the reactor.

On the 150-meter cavity length, the round-trip time is 1 micro-seconds for a laser beam. In an example, the laser light source is with a frequency of 1 MHz (=1/(1 micro-second)). When pulse energy of the laser light source is 1 Joule, after the laser beam propagating between each pair of mirrors 100,000 times, a total energy of 100 Kilo Joules is achieved ideally with repletion rate of 10 Hz assuming mirror loss in the cavity region has been ignored. For 200 pairs of mirrors or cavities, a total energy of 20 Mega Joules is achieved at the reaction region. The repetition rate of high-power pulse of 100 Kilo Joules is 10 Hz.

In an example, a pellet or hohlraum is delivered (or sucked) to the reaction region at high speed from a difference in pressure between the tube opening region (vacuum) and the fuel pellet delivery device or hohlraum delivery device. The supply device has a pressure that is an atmospheric pressure. The fuel pellet supply device or hohlraum supply device is located outside of the vacuum reactor. When the hohlraum with diameter of 5 mm cross the Fabry Perot cavity at the intersection where all of the high-power lasers are focused into a small spot at the center of the reactor, a speed of 10 km/second is desired. As noted, for a 150-meter cavity length, the round-trip time of the laser beam is 1 micro-seconds. When the hohlraum cross at the middle of the cavity, the subsequent laser beam pulse is coming in 0.5 micro-seconds. Before next pulse laser, the hohlraum passes though the cavity region. A speed of more than 10 kilometers/second (5 mm/0.5 microseconds=10 kilometers/second) is desired.

Instead of the hohlraum, the fuel pellet is injected from the tube as a fuel to generate a direct fusion reaction without the X-ray irradiation from the hohlraum, the speed of pellet is more than 2 kilometers/second (1 mm/0.5 microseconds=2 kilometers/second). A high energy pulse of 100 kilo Joule with a frequency of 10 Hz with the cavity length of 150 m is illustrated. The high speed of hohlraum and pellet can range from 10 kilometers per second to 2 kilometers per second, but is preferably more than 2~10 kilometers per second depending of size or diameter of hohlraum and pellet which cross the Fabry Perot cavity at the center of the reactor.

In an example with the cavity length of 150 meters and reactor diameter 150 meters, an advantage of such 150 m cavity length is that the high-power pulse laser has a repetition frequency of 10 Hz, which is lower. Another advantage is that high reflection mirrors are located at a distance of 75 meters from the center of the reactor, which is far away enough from the fusion reaction region to prevent damage to the mirrors. That is, the damage to the mirrors caused by the radiation of nuclear fusion reaction is reduced.

Figure 8:
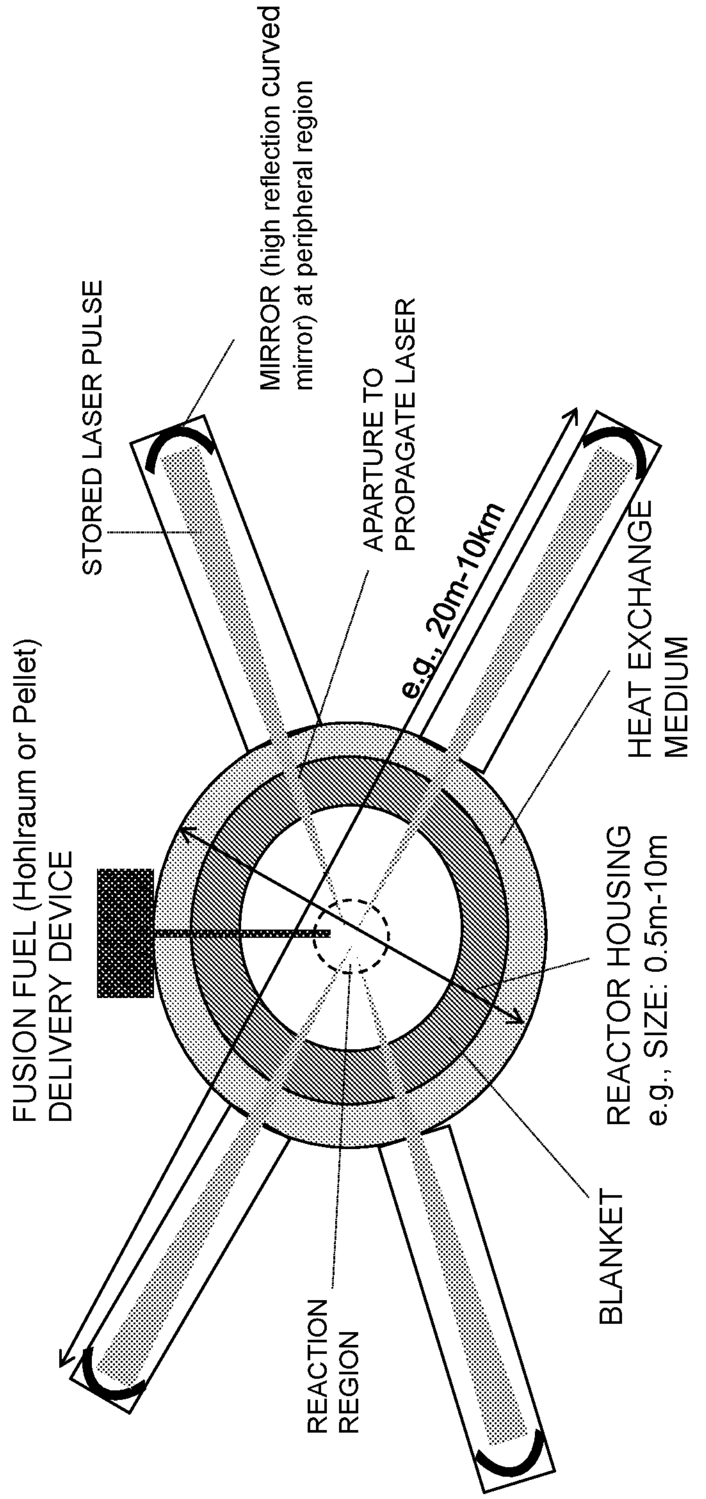
FIG. 8 is a simplified diagram of a laser fusion system, including mirrors coupled to longer cavity lengths than a diameter length of an inner reactor housing, according to an example of the present invention.

FIG. 8 is a simplified diagram of a laser fusion system, including mirrors coupled to longer cavity lengths than a diameter length of an inner reactor housing, according to an example of the present invention. As shown, the system has a reactor housing (e.g., chamber), blanket structure, heat exchange medium, delivery device, reaction region, and a plurality of cavity regions. Each of the cavity regions is configured with a pair of mirrors. A laser light source is configured to one mirror and a photo diode sensing device is configured with the other mirror opposing the laser light source.

In an example, the reactor chamber can be small with the diameter ranging from 0.5 meter to 10 meters, but can be smaller or larger. In an example, the blanket structure and heat exchange medium are inside or outside of small reactor chamber to absorb the fusion energy effectively. In an example, as shown, the mirrors are located at 75 meters, which can be more or less, away from the center of the small reactor to make the 150 meter cavity with a pair of mirrors to achieve a high-power pulse with the repetition rate of 10 Hz as discussed. Also, mirror damage caused by radiation of fusion reaction at the center of the reactor is reduced because the mirror is located at the distance of 75 meters from the center of the reactor. Also, volume of the reactor and cavity region is much smaller than the aforementioned examples. The vacuum pump is smaller and can achieve desirable vacuum conditions within a shorter time frame.

Figure 9:
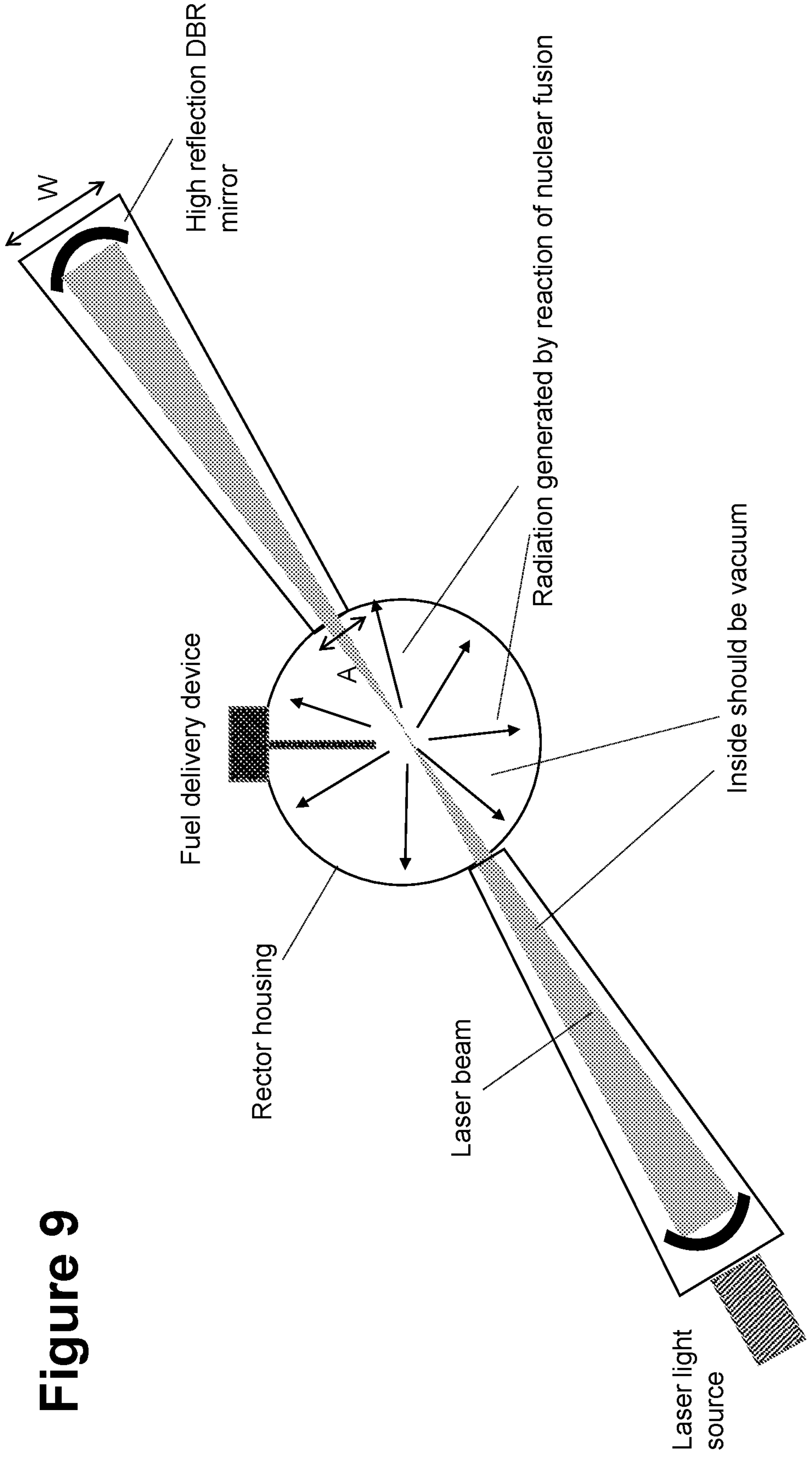
FIG. 9 is a simplified diagram of a laser fusion system, including a pair of mirrors coupled to a longer cavity length than a diameter length of an inner reactor housing, according to an example of the present invention.

FIG. 9 is a simplified diagram of a laser fusion system, including a pair of mirrors coupled to a longer cavity length than a diameter length of an inner reactor housing, according to an example of the present invention. As shown, the pair of mirrors define each cavity region. Each cavity extends through an aperture region in communication with the interior of the reaction chamber. A plurality of cavities intersect at the reaction region of the reactor housing.

In an example, the laser fusion system is illustrated. The system has a reactor housing having an interior region maintained in a vacuum environment. In an example, the system has at least a pair of aperture regions spatially disposed along a periphery of the reactor housing. In an example, each of the aperture regions has an aperture size of A and a reaction region within a vicinity of a spatially center region of the reactor housing. In an example, the reaction region is characterized by a reactor length extending along a major cross-section of the reactor region. In an example, at least one cavity region in communication with the reaction region such that the optical cavity region is spatially disposed through the reaction region, configured through the pair of aperture regions opposing each other, and extending outside of the reaction region. In an example, a pair of mirrors is configured, respectively, on the first end and the second end of the cavity regions, each of the mirrors having a mirror size of W. A laser light source configured to emit electromagnetic radiation coupled to one of the pair of mirror devices such that a laser beam propagating from the laser light source between the pair of mirror devices within the cavity region increases in energy intensity from a first intensity to a second intensity to an Mth intensity for M cycles of the laser beam propagating between the pair of mirror devices, where M is greater than 1,000 cycles. In an example, the system has a fuel pellet or a container comprising the fuel pellet inside disposed within the reactor region and coupled to the cavity region to provide an energy level sufficient to ignite the fuel pellet for a fusion reaction and a ratio of W/A of at least 2 up to 500 configured to reduce any damage to one of mirror devices by reducing the aperture size to a predetermined dimension to prevent the radiation of the fusion reaction generated at a center of reaction region to interact with the mirror device through the cavity region.

Figure 10:
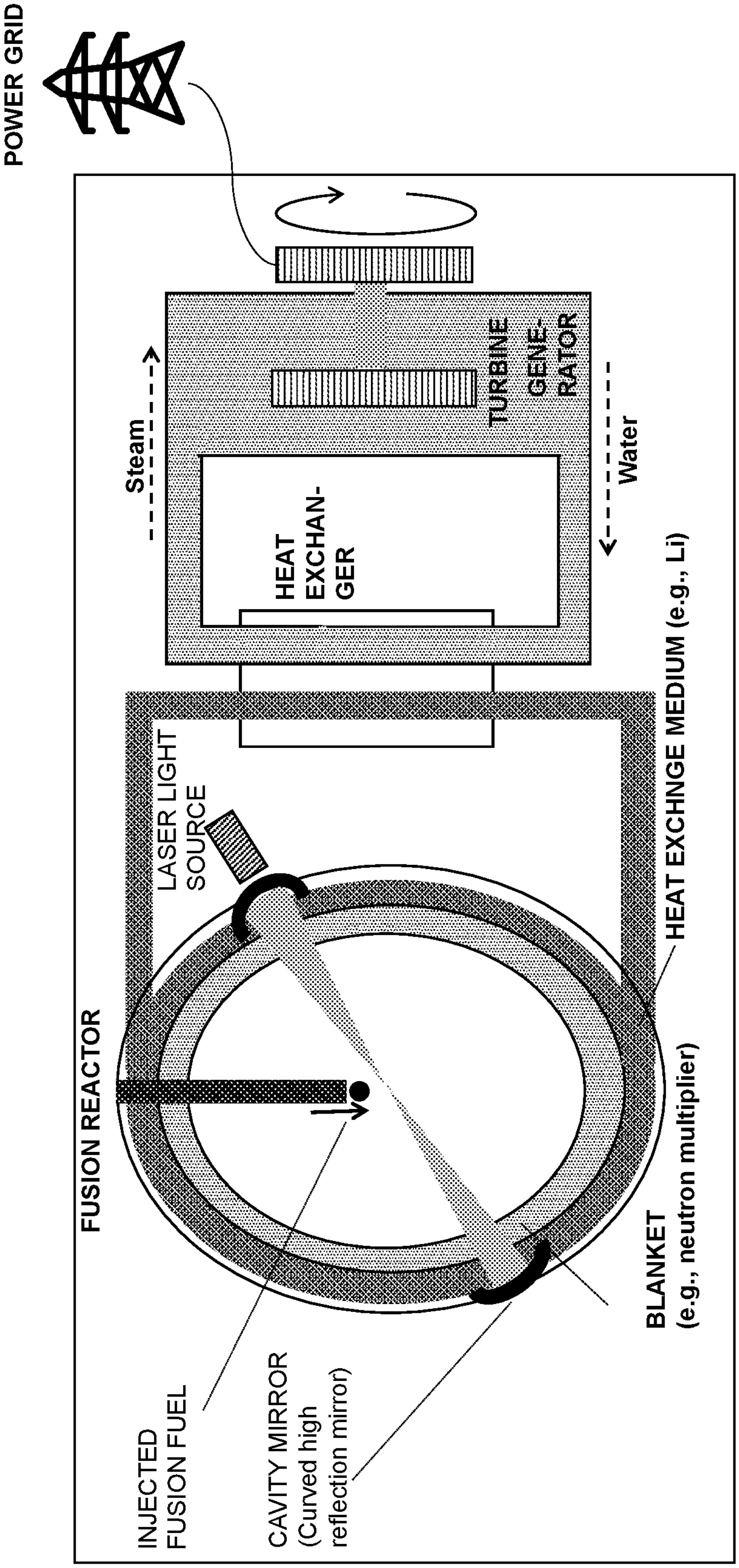
FIG. 10 is a simplified diagram of a fusion reactor configured for power generation according to an example of the present invention.

FIG. 10 is a simplified diagram of a laser fusion system according to an example of the present invention. As shown, the system has a high-power pulse laser system, which is configured with a fusion reactor. The fusion reactor includes a pellet or hohlraum within a blanket structure, which could absorb the fusion energy including the momentum energy of neutron, helium and tritium to generate a thermal energy, and some of neutrons are used to multiply tritium for reuse as a fuel. Then, the thermal energy is transferred to the surrounding heat exchange medium. The blanket is surrounded by a heat exchange medium which is configured to transfer thermal energy from the blanket to the medium. The heat exchange material must be able to circulate the tube to travel to heat exchange systems connecting to heat exchanger. The heat exchanger transfers the thermal energy from the medium to water to generate the high-pressure steam, which rotates a turbine. The rotation of the turbine in a magnetic field generate the electricity, and then it works as an electric generator for use on a power grid for a private or public power system.

In an example, the system includes a blanket structure. A blanket structure lining a fusion reactor is a layer of material that is used to surround the plasma in the fusion reaction chamber. The primary function of the blanket structure is to provide structural support for the plasma and to protect the plasma from the walls of the reaction chamber. The blanket structure is also responsible for transferring the heat generated by the plasma to a heat exchange medium. The blanket including beryllium microsphere is effective to multiply tritium by absorbing some of neutrons.

There are several factors to consider when designing a blanket structure for a fusion reactor. One important factor is the material used for the blanket structure. The material must be able to withstand the high temperatures and pressures of the plasma, as well as the radiation generated by the reaction. Materials that are commonly used for the blanket structure include refractory metals such as tungsten and molybdenum, as well as alloys such as stainless steel and Hastelloy.

Another factor to consider is the thickness of the blanket structure. The thickness of the blanket structure should be sufficient to provide structural support for the plasma and to protect it from the walls of the reaction chamber, but it should not be so thick as to inhibit the transfer of heat from the plasma to the cooling system.

The blanket structure should also be designed with the geometry of the fusion reactor in mind. The blanket structure should be able to conform to the shape of the plasma and the reaction chamber, and it should be able to accommodate any changes in the shape of the plasma as the reaction progresses. Preferably, the blanket structure includes the layer containing beryllium microsphere or $Li_2TiO_3$, among other compounds, to multiply a tritium material.

Overall, the ideal blanket structure for a fusion reactor would be made of a material that is able to withstand the high temperatures and pressures of the plasma, and it would be of a sufficient thickness to provide structural support and protection for the plasma while also allowing for the efficient transfer of heat to the heat exchange medium. In an example, the blanket structure has a thickness of 0.1 m to 1 m. The blanket first wall structure is made of a suitable material such as reduced activation ferritic steel (e.g., RAF; Reduced Activation Ferritic/Martensitic Steel), vanadium alloy (e.g., V-4Cr-4Ti; V alloy), silicon carbide composite (e.g., SiC/SiC composite), including combinations thereof.

In an example, a heat exchange material is configured surrounding the blanket structure. In an example, a heat exchange material for a fusion reactor is a substance that is used to transfer heat from the plasma, the ionized gas and all types of radiations from the fusion reaction, to a cooling system.

There are several factors to consider when selecting a heat exchange material for a fusion reactor. One important factor is the material's thermal conductivity, which is a measure of its ability to transfer heat. Materials with high thermal conductivity are more effective at transferring heat and are therefore more suitable for use in a fusion reactor. Some examples of materials with high thermal conductivity include metal materials.

Another factor to consider is the material's melting point. The heat exchange material must be able to circulate the tube to travel to heat exchange systems where the heat is transferred to water, the water becomes steam and then connecting to a usual steam turbine system. This requires the material to have a low melting point. Materials with low melting points include lithium and sodium.

Overall, the ideal heat exchange material for a fusion reactor would have high thermal conductivity, a low melting point, and good resistance to corrosion and erosion. In an example, the heat exchange material can be any suitable material such as lithium and sodium. Of course, there can be other variations, modifications, and alternatives.

Figure 11:
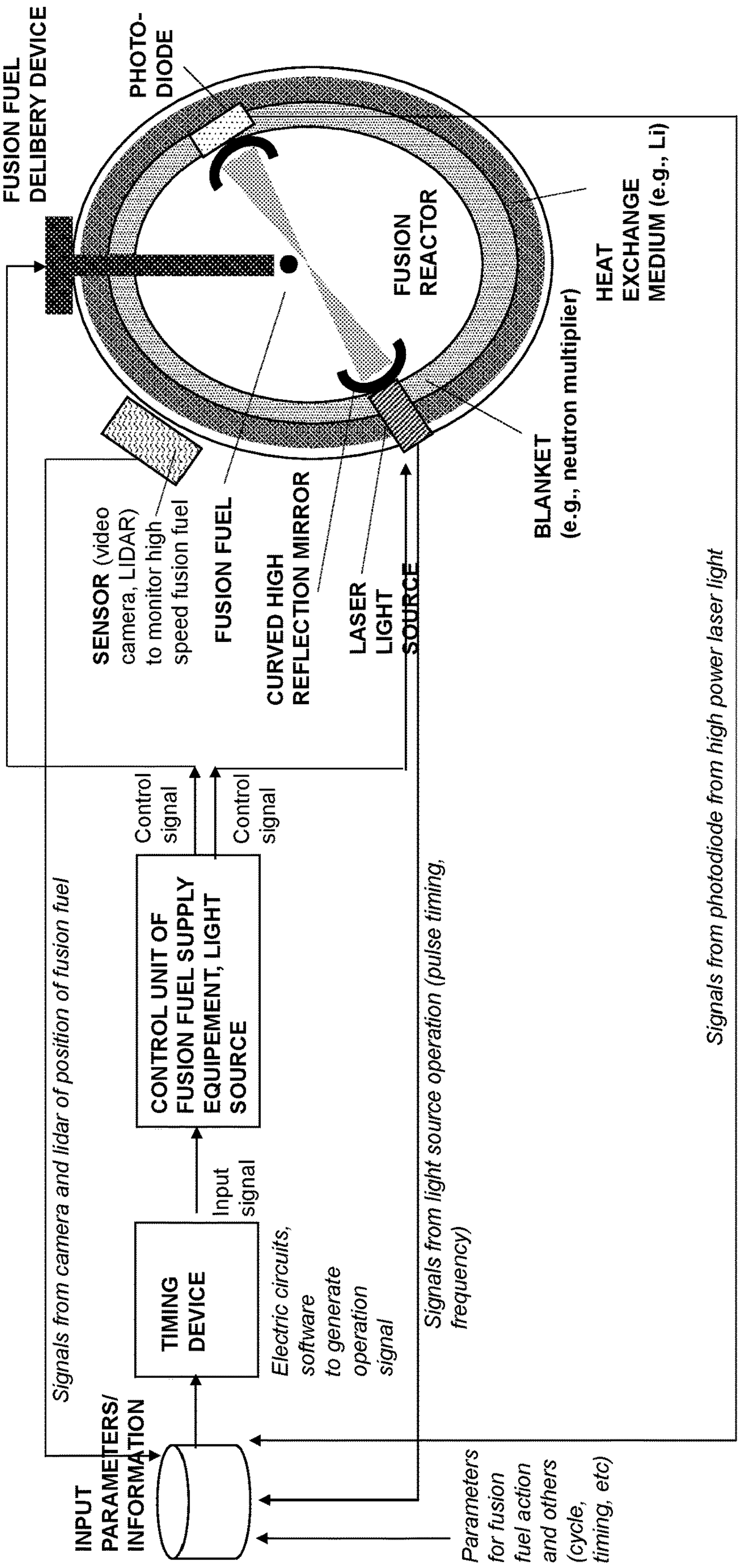
FIG. 11 is a more detailed diagram of a fusion reactor according to an example of the present invention.

FIG. 11 is a more detailed diagram of a fusion system according to an example of the present invention. As shown, the system includes various elements including input parameters and information, a timing device, a driver device, and a fusion system. The fusion system has inner reactor region configured concentrically with an outer heat exchange region. The reactor also has a plurality of laser device, each of which is configured to a pair of mirror devices to form a cavity region. The plurality of laser devices are disposed spatially around a periphery of a reaction region. The system has a hohlraum or pellet supply device. The system has a light detection and ranging (LIDAR) system and video camera system to image and track a location of a fusion pellet or hohlraum.

As shown, information and/or feedback from the laser light source are fed into a processing platform. The processing platform can be a suitable computer-based processor, controller, or other type of processor. Examples of feedback can include signals from the light source and the photodiodes to detect the transmitted light from the backside of each mirror, including pulse timing, frequency, power output, and other parameters. Parameters for cycling laser devices are also fed into the processing platform. The processing platform further includes storage, such as volatile and non-volatile memory, including dynamic random-access memory, flash memory, static random-access memory, fixed memory devices, hard drives, and any combination of electronic and/or optical memory devices. The information from the processing platform is fed into a timing device. The timing device is configured with a clock signal, which is configured with the information, to generate an electronic signal or signals for the driver device. The driver device includes an electrical output or outputs to send signals to the various elements of the reactor. The elements include the fuel pellet or hohlraum supply device. Further details of the present system can be found throughout the present specification and more particularly below.

Figure 12:
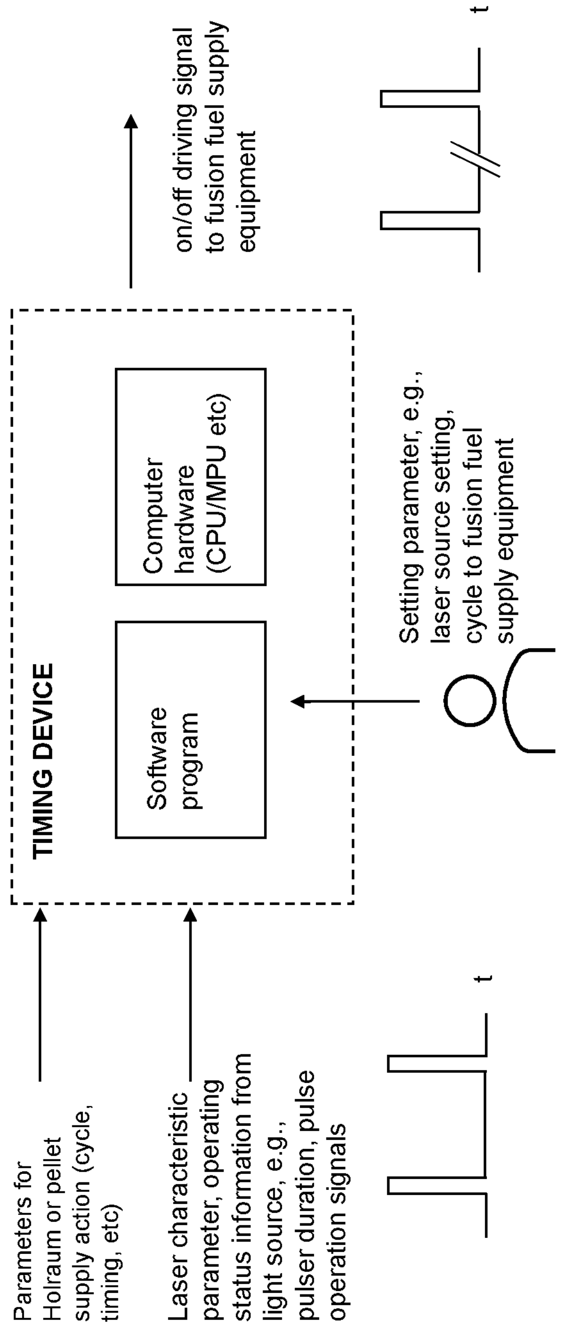
FIG. 12 is a detailed diagram of a timing device for a fusion system in an example of the present invention.

FIG. 12 is a detailed diagram of a timing device for a fusion system in an example of the present invention. As shown, the timing device receives inputs of, for example, laser characteristics, such as operating status, pulse duration, pulse operation, frequency, and other information. The timing device includes a software program, which is programmable, and computer hardware, among other elements. The timing devices outputs an on/off signal from the driver device to the fuel pellet supply or other system components.

In an example, a computer for controlling a drive, which is a high-speed driver, also known as a "drive computer," is a specialized device that is used to control and monitor the operation of a high-speed driver, such as the actuator. In an example, the drive computer typically includes a microprocessor or microcontroller, which is a type of central processing unit (CPU) that is responsible for controlling the operation of the drive. The drive computer also includes input/output (I/O) interfaces, which allow it to receive input signals from sensors or other devices and to output control signals to the drive. In an example, the drive computer may also include memory for storing data and instructions, as well as various other hardware and software components that enable it to perform its functions. Some drive computers may also include additional features, such as communication interfaces for communicating with other devices or systems, or built-in diagnostic tools for monitoring and troubleshooting the drive. Further details of the present system and method are described below.

In an example, all of laser light source should be synchronized for high power pulsed laser to hit the fuel pellet or the hohlraum in the center of reactor. The position of pellet or the hohlraum is monitored by lidar and video camera and, feed back to the computer to synchronize with all of the laser light source, signals of photodiode located at backside of mirror, the fuel pellet or the hohlraum supply speed and supply repetition rate.

Figure 13:
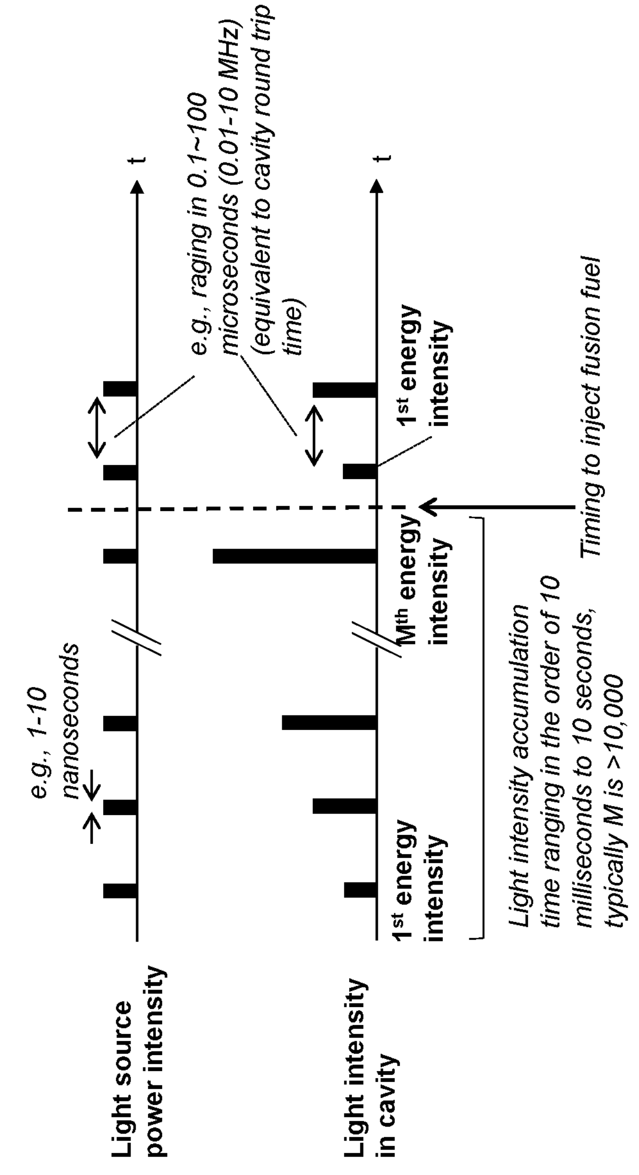
FIG. 13 is a timing diagram for generating a high intensity pulse laser in an example of the present invention.

FIG. 13 is a timing diagram for generating a high intensity pulse laser in an example of the present invention. As shown in the first line labelled "Light source power intensity," each laser pulse from the light source has a pulse in a nanosecond range, e.g., 1-10 nanoseconds. A frequency for the pulse can range from 0.1 to 100 microseconds (0.01 to 10 MHz), for example. Light intensity in a cavity increases in intensity with each pulse from the source from a first energy intensity, a second energy intensity, to an Mth energy intensity, where M is 1,000 or greater, but can be fewer or more depending upon the application. Once the Mth energy is achieved from each of the laser cavity regions, the present method and system injects a pellet or a hohlraum into a center of each cavity or reactor to initiate a fusion reaction.

In an example, the present high intensity pulse laser system can be configured with a laser fusion system for generating energy. As an example, laser fusion is a process that uses lasers to initiate and sustain a nuclear fusion reaction, which is a process that releases energy by combining atomic nuclei. This process has the potential to provide a virtually limitless and clean source of energy. In laser fusion, a beam of high-energy lasers is used to create a plasma, which is a hot, ionized gas that is composed of free electrons and atomic nuclei. The plasma is then compressed and heated to extremely high temperatures and pressures, causing the atomic nuclei to fuse together and release energy. An example of laser fusion is inertial confinement fusion (ICF). In ICF, a laser beam is used to create a shock wave that compresses a small pellet of fusion fuel. Further details of laser fusion are described in more detail below.

In an example, the present invention provides a laser fusion system. The system has a reactor housing, which includes an interior region maintained in a vacuum environment. The reactor housing creates a vacuum chamber. The system has a reaction region within a vicinity of a spatially center region of the reactor housing and a peripheral region formed within an interior of the reactor housing, the peripheral region surrounding the reactor region. In an example, outside the reactor housing, connect inside, the system forms radial protrusions while maintaining a vacuum, and create a reflecting mirror inside beyond that, as shown.

In an example, the system has a plurality of cavity regions numbered from 1 through N within the interior region of the reactor housing and spatially configured around the peripheral region such that each of the plurality of cavity regions extends from a first side of the peripheral region to a second side of the peripheral region. Preferably, the first side is opposing the second side along a straight line, and forms a linear path along a diameter of the interior region. In an example, the plurality of cavity regions forms a hub and spoke configuration. Each cavity region has a center region concentric with the reactor region and each cavity region has a first end coupled to the first side and a second end coupled to the second side of the peripheral region. In an example, N is greater than 10 and can be 100, 200, or thousands, although there may be fewer cavities in other examples.

In an example, a pair of mirrors are configured, respectively, on the first end and the second end of the cavity regions. In an example, a laser light source configured to emit electromagnetic radiation coupled to at least one of the pair of mirror devices such that a laser beam propagating from the laser light source between the pair of mirror devices increases in energy intensity from a first intensity to a second intensity to an $M^{th}$ intensity for M cycles of the laser beam propagating between the pair of mirror devices, where M is greater than 1,000 cycles, although there may be fewer or more.

In an example, N is 10 to 200; and M is 1,000 and greater.

In an example, the system has a fuel pellet or a container comprising the fuel pellet inside disposed within the reactor region and is coupled to the plurality of cavity regions as each of the plurality of cavity regions spatially intersect within the reactor region to provide an energy level sufficient to ignite the fuel pellet directly or indirectly (through the Xray radiation inside of hohlraum as mentioned previously) for a fusion reaction.

In an example, the system also has a photo diode detector device coupled to at least one of the mirrors for each pair of mirrors and configured opposite of the laser device.

In an example, each pair of mirrors is a curved or deformable mirror device. In an example, each of the mirrors is a high reflection curved mirror with a reflectivity of more than 99.99%, which is focused into the reaction region of laser fusion system. In an example, each of the mirrors is placed inside of the reactor housing and maintained in the vacuum environment. The most preferred location of the mirrors is configured outside the reactor housing, connect inside, create radial protrusions while maintaining a vacuum, and create a reflecting mirror inside beyond that, as shown.

In an example, each of the cavity regions is a Fabry Perot resonator. In an example, the laser light source is configured to output electromagnetic radiation with a power of 0.01 Joule and greater.

In an example, the tube opening region is a vacuum region coupled to a fuel pellet (or the hohlraum) delivery device. At first, pellet (or the hohlraum) is placed inside of the fuel pellet (or the hohlraum) delivery device at an atmospheric pressure because the device is located outside of reactor. By opening the gate or valve in the tube, the fuel pellet (or the hohlraum) is sucked into the tube due to the pressure difference from atmospheric pressure to vacuum. Then, the fuel pellet (or the hohlraum) is injected into the reaction region from the opening of the tube with a high speed into the reaction region.

In an example, the container is a hohlraum. In an example, the container is a hohlraum; and wherein the laser beam is irradiated to an inside surface of the hohlraum to generate X-rays that interact with the fuel pellet. In an example, the container is a hohlraum; and wherein the laser beam is irradiated to an inside surface of the hohlraum to generate Xrays that irradiate the fuel pellet to generate a reaction of nuclear fusion.

In an example, the system has a blanket structure configured to the reactor housing and adapted to absorb a fusion energy from the reactor housing to change the fusion energy to thermal energy, the blanket structure is coupled to a heat exchange medium which is configured to transfer thermal energy from the blanket structure to the heat exchange medium. In an example, the heat exchange medium transfers the thermal energy from the heat exchange medium to water to generate a high-pressure steam adapted to rotate a turbine, the turbine coupled to an electric generate to create electrical energy. The blanket structure and heat exchange medium are placed at a region of the reactor housing having a smaller diameter to absorb the fusion energy effectively in comparison with a diameter of the reactor housing at the peripheral region where mirrors are placed in an example.

In an example, the system has a fuel pellet or hohlraum delivery device coupled to the reactor housing, a timing device coupled to the fuel pellet or hohlraum delivery device; and a driver device coupled between the timing device and the fuel pellet delivery device. In an example, the fuel pellet or hohlraum is delivered by a tube within a vicinity of the reaction region of laser fusion system. In an example, the tube has an opening that is less than 0.01 mm or 20 mm from the reaction region. The fuel pellet or hohlraum is characterized by a speed of 0.5 km/sec to 100 km/sec at the reaction region in an example. The fuel pellet or hohlraum is supplied by a repetition rate of 1 Hz to 50 Hz at the reaction region in an example, the fuel pellet or hohlraum is accelerated to a high speed by using the pressure difference between the fuel pellet or hohlraum delivery device region and the opening region of the tube in an example, or gunpowder, or other energy or accelerating devices.

In an example, the cavity region defined by a spatial length between each pair of mirrors is larger than a diameter of the reactor housing; and further comprising a blanket structure and a heat exchange medium configured on an outer or inner wall of the smaller diameter reactor housing to reduce any damage to any of the mirror devices from a radiation generated by the fusion reaction at the reaction region in the laser fusion system.

In an example, the present invention provides a laser fusion system. The system has a reactor housing having an interior region maintained in a vacuum environment. The system has a plurality of aperture regions spatially disposed along a periphery of the reactor housing. In an example, each of the aperture regions having an aperture size of A. In an example, the system has a reaction region within a vicinity of a spatially center region of the reactor housing. The reaction region characterized by a reactor length extending along a major cross-section of the reactor region.

In an example, a plurality of cavity regions numbered from 1 through N in communication with the reaction region such that each of the plurality of cavity regions are spatially disposed through the reaction region. Each of the plurality of cavities is configured through a pair of aperture regions opposing each other, and extends outside of the reaction region such that the plurality of cavity regions forms a hub and spoke configuration and are characterized by an intersection region within the spatially center region of the reaction region. In an example, N is greater than 10, but can be larger or smaller.

In an example, a pair of mirrors are configured, respectively, on the first end and the second end of each of the cavity regions, each of the mirrors having a mirror size of W.

In an example, a laser light source is configured to emit electromagnetic radiation coupled to at least one of the pair of mirror devices such that a laser beam propagating from the laser light source between the pair of mirror devices increases in energy intensity from a first intensity to a second intensity to an Mth intensity for M cycles of the laser beam propagating between the pair of mirror devices, where M is greater than 1,000 cycles.

In an example, a fuel pellet or a container comprises the fuel pellet inside disposed within the reactor region and is coupled to the plurality of cavity regions as each of the plurality of cavity regions spatially intersect within the reactor region to provide an energy level sufficient to ignite the fuel pellet for a fusion reaction.

In an example, a ratio of W/A of at least 2 up to 500 is configured to reduce any damage to one or more of mirror devices by reducing the aperture size to a predetermined dimension to prevent the radiation of the fusion reaction generated at a center of reaction region to interact with the mirror device through any one of the cavity regions.

In an example, the aperture size A is a diameter, width, height, or major dimension of the aperture; and wherein the mirror size W is a diameter, width, height, or major dimension of the mirror.

In an example, the present invention provides a laser fusion system. The system has a reactor housing having an interior region maintained in a vacuum environment. In an example, the system has at least a pair of aperture regions spatially disposed along a periphery of the reactor housing, each of the aperture regions having an aperture size of A and a reaction region within a vicinity of a spatially center region of the reactor housing. In an example, the reaction region is characterized by a reactor length extending along a major cross-section of the reactor region. In an example, at least one cavity region in communication with the reaction region such that the optical cavity region is spatially disposed through the reaction region, configured through the pair of aperture regions opposing each other, and extending outside of the reaction region. In an example, a pair of mirrors is configured, respectively, on the first end and the second end of the cavity regions, each of the mirrors having a mirror size of W. A laser light source configured to emit electromagnetic radiation coupled to one of the pair of mirror devices such that a laser beam propagating from the laser light source between the pair of mirror devices within the cavity region increases in energy intensity from a first intensity to a second intensity to an Mth intensity for M cycles of the laser beam propagating between the pair of mirror devices, where M is greater than 1,000 cycles. In an example, the system has a fuel pellet or a container comprising the fuel pellet inside disposed within the reactor region and coupled to the cavity region to provide an energy level sufficient to ignite the fuel pellet for a fusion reaction and a ratio of W/A of at least 2 up to 500 configured to reduce any damage to one of mirror devices by reducing the aperture size to a predetermined dimension to prevent the radiation of the fusion reaction generated at a center of reaction region to interact with the mirror device through the cavity region.

Figure 14:
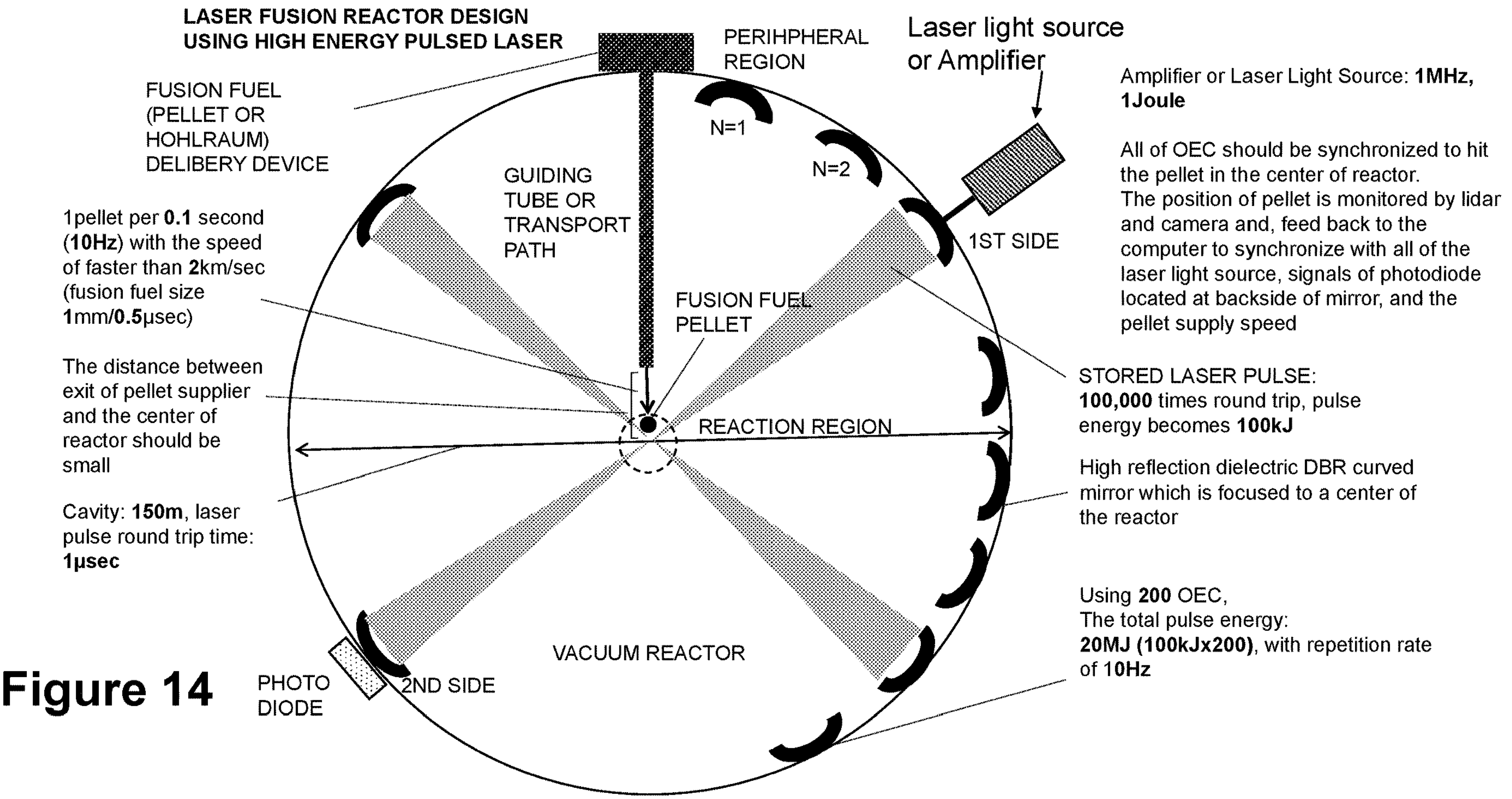
FIG. 14 is a simplified diagram of a fusion reactor according to an alternative example of the present invention.

FIG. 14 is a simplified diagram of a fusion reactor according to an alternative example of the present invention. As shown, the system has a plurality or N Fabry Perot resonant cavities, each of which is defined between a pair of mirror devices opposing each other in an example. The cavities are configured in a reactor housing. The reactor housing is maintained in a vacuum environment. Each cavity has a laser light source or amplifier coupled to one end and a photo diode (or detector) coupled to the other end or to the same end. Each of the cavities intersect in a center region to form a hub and spoke configuration. In an example, the system has a fuel pellet or hohlraum supply (or delivery) device, as shown.

Each of the laser light sources is synchronized for a high-power pulsed laser to interact (or hit) the fuel pellet or hohlraum in a reaction region or center of a reactor housing. A sensing system, such as LIDAR (e.g., light detection and ranging) and video camera, can be used in conjunction with the laser light sources to synchronize delivering the high-power pulsed laser to the fuel pellet to initiate a fusion reaction. Further details of the present system can be found throughout the present specification and more particularly below.

In an example, the fusion reactor has a reactor housing, blanket structure configured surrounding a reaction region, and a heat exchange medium surrounding the blanket structure. A fusion fuel dispenser or deliver device is configured on an outer region of the reactor and has guiding member configured to deliver a fuel pellet into the reaction region. A plurality of cavity regions is configured spatially around a periphery of the reactor. Each of the cavity regions has a pair of mirrors configured to a laser light source for forming a resonator device.

In an example, the fusion reactor housing is made of a suitable material to withstand mechanical and thermal conditions. The housing has one or more of the various functions: ensure that the target survives injection and/or placement (i.e., does not deform or melt); allows the driver energy to be coupled to the target with the preferred precisions; repeatedly withstand the pulsed emissions of x-rays, ions, and neutrons from the fusion reactions; recover conditions to allow the next target to be shot with irradiation; provide a means to convert heat to electrical power; provide a means to breed and recover tritium, and possibly others.

In an example, a preferred chamber configuration uses a solid wall and maintains the chamber in vacuum. A typical chamber has a first wall that directly sees target emissions, an encasing lithium-bearing blanket, and a structure to hold everything together. The chamber and target design depend on each other since each target design produces a distinct energy partitioning among the reaction products that is preferably withstood by the chamber's first wall. In a conventional laser fusion scenario based on deuterium and tritium fuel, about 75% of the fusion energy is incident on the wall as neutrons, about 23% as energetic ions, and the remaining 2% as X rays.

Upon ignition, helium retention occurs when the high-energy (e.g., several-MeV) helium ions produced by the target are driven 2-5 micron deep into the surface. The heat loading appears to be solved by making the first wall from a 1-mm-thick tungsten armor layer bonded to a ferritic-steel substrate structure. Another first wall of a fibrous tungsten material whose diameter is smaller than the migration distance, e.g., 50-100 nm.

Both Pb-17 Li (i.e., 83% lead, 17% lithium) and FLIBE (i.e., fluorine-lithium-beryllium) blankets have been evaluated specifically for laser-fusion tritium breeding and power conversion. Tritium is produced when the neutrons react with lithium in one of two ways. One solid wall concept uses a more-conventional reduced-activation F82H (e.g., The microstructural of F82H steel is described as tempered ferritic/martensitic structure composed of lath martensite and precipitates such as $M_{23}C_6$ (M=Cr, W and Fe) and MX (M=Ta, V; X=C, N) steel wall and tungsten armor. In an example, the initial chamber temperature is 550 Degrees Celsius and the electrical conversion efficiency is estimated to be 38%. A second solid wall concept uses a more-advanced ferritic steel wall and tungsten armor. The chamber operates at 700 Degrees Celsius, and the electrical conversion efficiency can be as high as 49% in an example.

As an example, the material can be F82H steel wall and tungsten armor or ferritic steel wall and tungsten armor, among others. The mechanical conditions include a vacuum of 300 Torr to 0.001 torr. The thermal condition can be temperatures greater than 400 Degrees Celsius, but can be others. The blanket structure is made using a Pb-17Li (e.g., 83% lead, 17% lithium), FLIBE (e.g., fluorine-lithium-beryllium) or lithium, which is designed to laser-fusion tritium breeding and power conversion from radiation energy to thermal energy. The heat exchange medium is a suitable material such as liquid lithium. The heat exchange medium transfers thermal energy from a fusion reaction to an electric generator.

In an example, the system has a plurality of cavity regions, each of which is resonating, having an intersection generating a high intensity laser for initiating fusion. The plurality of cavity regions is numbered from 1 through N within an interior region of a reactor and spatially configured around a peripheral region of the reactor. Each of the plurality of cavity regions extends from a first side of the peripheral region to a second side of the peripheral region and forms a linear path along a diameter of the interior region from a first side to a second opposing side of the reactor. Preferably, the plurality of cavity regions forms a hub and spoke configuration such that each cavity region has a center region concentric with the reactor region and also intersects with each other at the center region. Each cavity region has a first end coupled to the first side and a second end coupled to the second side of the peripheral region, where N is greater than 10.

In a preferred example, each of the cavity regions resonate and generate a high intensity laser beam. The high intensity laser beam has a power of from 1 kW to 1 MW. The high intensity laser beam is substantially uniform and has a power intensity uniformity of 98% and greater or 99% and greater for both a spatial and temporal uniformity.

In a preferred example, the cavity region is configured in a housing. The housing is made of a suitable material, such as F82H steel wall and tungsten armor or ferritic steel wall and tungsten armor. In an example, the fusion reactor housing is made of a suitable material to withstand mechanical and thermal conditions. The housing has one or more various features: ensure that the target survives injection and/or placement (i.e., does not deform or melt); allows the driver energy to be coupled to the target with the required precisions; repeatedly withstand the pulsed emissions of x-rays, ions, and neutrons from the fusion reactions; recover conditions to allow the next target to be shot; provide a means to convert heat to electrical power; provide a means to breed and recover tritium; and others.

A laser light source is configured to emit electromagnetic radiation coupled to at least one of a pair of mirror devices configured on each side of the cavity region. A laser beam propagating from the laser light source between the pair of mirror devices increases in energy intensity from a first intensity to a second intensity to an Mth intensity for M cycles of the laser beam propagating and resonating between the pair of mirror devices, e.g., where M is greater than 1,000 cycles. The laser beam concentrated and generated at the intersection at the center region interacts with a fuel pellet to initiate a fusion reaction. In an example, the light source can be a solid state laser, a fiber laser, or other suitable laser. The laser is preferably a fiber laser, AlInGaN based laser, Innoslab laser, coherent beam combining (CBC) laser, optical phase array (OPA) laser, diode pumped solid state (DPSS) laser, chirped pulse amplification (CPA) laser, solid state laser, gas laser, semiconductor laser, and others. The laser emits electromagnetic radiation in the ultraviolet range and has a power rating of 10 kW and greater. Further details of a pellet dispenser is described throughout the present specification and more particularly below. Additional optics to generate second or third harmonic laser (e.g., green or UV wavelength regions) from an infrared (IR) laser.

Figure 15:
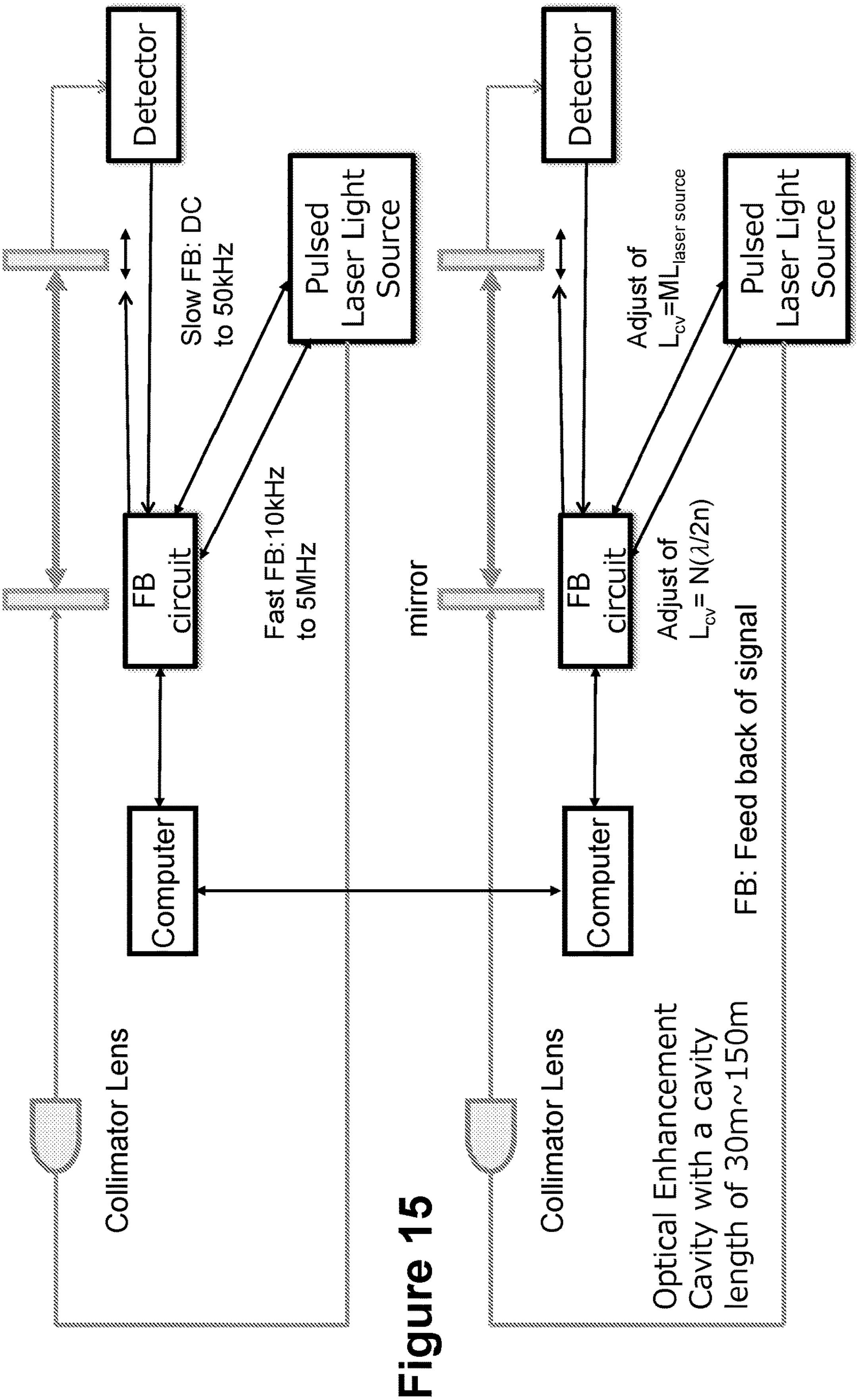
FIG. 15 is a simplified diagram of a control system of a plurality of pulsed laser light source configured with a plurality of OECs according to an example of the present invention.

FIG. 15 is a simplified diagram of a plurality of pulsed laser light source configured with a plurality of resonant cavities according to an example of the present invention. As shown, two OECs are shown. The present invention of fusion reactor uses 200 OECs, although there can be fewer or more. The control system for two OECs is applicable and can be configured for for 200 OECs in an example. As shown, each lane, among a plurality of lanes, has a pulsed laser light source generating a pulsed laser beam. In an example, the pulsed laser light source is a specialized laser system that is used to initiate and sustain nuclear fusion reactions. In an example, the pulsed laser light source typically has several components such as a laser oscillator, a laser amplifier, and a beam-shaping system, e.g., electro optic modulator (EOM), acoustic optic modulator (AOM). In an example, the laser oscillator generates a single mode low-power, CW laser or short-pulsed laser beam. This beam is then amplified by the laser amplifier, which increases the power of the beam to the level required for the fusion reaction. The amplified beam is then directed through the beam-shaping system, which focuses the beam to a small spot size and shapes the beam to match the target. In an example, the light source has a single mode continuous wave (CW) laser source device. The single mode CW laser device is characterized by a power, e.g., 10 mW to 1 MW, and is configured to emit electromagnetic radiation as a first laser beam in a wavelength range, e.g., 300 nm to 1070 nm, but can be others. In example of the pulsed laser light source has a pulsed energy from 1 J to 1 MJ in an example.

As shown, the laser beam traverse through collimator lens in each lane, as shown. The collimator lens is coupled to the laser amplifier to generate a laser beam to a back side of one of a pair of the mirrors. In an example, the collimator lens is a device that is used to configure a laser beam for uniform irradiation on a back of a mirror device. It is a type of optical lens that is designed to take a diverging beam of light and convert it into an appropriate beam profile to fit to the optical mode in the cavity. The collimator lens typically has one or more optical elements, such as spherical lenses, cylindrical lenses, or aspheric lenses, that are arranged in a specific configuration to achieve the desired collimation of the laser beam.

The collimator lens is placed in front of the laser source, and the laser beam is directed through the lens, which collimates the beam by focusing the light rays with an appropriate beam profile to fit to the optical mode in the cavity, typically the shape has Gaussian profile. The beam is then directed towards the back of the mirror device. The collimator lens is critical for ensuring that the laser beam is of uniform intensity and has a small convergence/divergence angle, which is important in the present application. The lens can be made of a variety of suitable materials such as glass, plastic, quartz, or even metal in some cases. An example of a collimator lens is made of synthetic quartz.

In the present invention, the collimator lens can be replaced with a series of 1~3 optical elements, which are collimator lens, convex lens, and others. In an example, a reason for such elements is that the concave mirror of the OEC focuses the laser beam to the center of the OEC. Lined up 1~3 optical elements coupled to the concave mirror of the OEC have to focus the laser beam to the center of the OEC.

In each lane, the collimator lens directs the pulsed laser beam to a pair of mirrors, which are configured to reflect the pulsed laser beam to resonate and form a cavity. In an example, a Fabry Perot resonant cavity, provided from a plurality of resonant cavities, is derived from a irradiated pulse laser beam onto the back side of the mirror device. In an example, the resonant cavity is coupled to receive an amplified laser beam from the laser amplifier device through the collimator lens and configured to be circulated between the pair of mirror devices for at least 10 to 100,000 cycles to cause the laser beam to increase in intensity from an initial intensity to a final intensity and resonate between the pair of mirror devices. Each of the resonant cavities is an optical enhancement cavity (OEC). Each OEC is characterized by a cavity length with a cavity length fluctuation of less than $\pm 2\times(\lambda/2n)$, where $\lambda$ is an emission wavelength of a laser light source, n is a refractive index of air or vacuum.

In an example, each of the mirrors is a concave mirror with a high reflection coating of dielectric Distributed Bragg Reflector (DBR). Using the concave mirror, the laser light is focused at a center of the OEC to increase the laser power density at the center of the cavity to generate the laser fusion using the high-power density pulse at the center of the OEC. At the center of the OEC, a beam waste of the laser beam should be less than 800 microns because in the case of the direct fusion, the size of the target of pellet is more than 1 mm. Also, each of the mirror is a deformable mirror to adjust the beam profile of the laser beam. The power density of the laser beam at the surface of dielectric DBR mirrors is less than 10 J/cm$^2$ to reduce and even minimize the damage of the mirrors. When the power of the pulsed laser beam increases, the surface area of the mirrors increases to reduce the power density less than 10 J/cm$^2$. For example, for a pulse energy of 10 KJ, the surface area of the mirror should be more than 1,000 cm$^2$. If it is difficult to obtain the uniform laser beam radiation power density at the surface of concave mirror, the surface area of concave mirror is preferably less than 1,000 cm$^2$.

As shown, a computer controller and feedback circuit are coupled to a detector and each element including modulators, laser amplifier, second mirror (opposite side mirror coupled to the laser source) of OEC and source of the pulsed laser light source. As shown, the computer controller for receiving feedback from a feedback circuit coupled to a plurality of detectors coupled to a second mirror of OEC and adjusting a variety of modulators, an amplifier, and single mode laser light source and position of the second mirror of OEC or laser light source which is controlled by piezo actuator is a system that is used to control the output of a laser beam. The feedback circuit, which is coupled to a plurality of detectors, is used to measure the characteristics of the laser beam, such as its intensity, phase, and frequency, within the resonant cavity. Such information is then sent to the computer controller, which uses it to adjust the various modulators, the amplifier, and the single mode laser light source to optimize the output of the laser beam. As will be described below and throughout the present specification is a controller with a first control, second control, third control, final control, and other controls. Such terms including first control among others, are not to be limiting, and the control can be used alone, or combined, or modified, depending upon the application. The terms first, second, third, and final also do not imply order in one or more applications.

In an example, the controller has a first control of OEC is $L_{cav}=ML_{source}$. A cavity length ($L_{source}$) of a pulsed laser light source, which is configured to $L_{cav}=ML_{source}$ maintains a resonance between the pulsed laser light source and the OEC whereupon $L_{cav}$ is a cavity length of an optical enhancement cavity (OEC) formed by a pair of mirrors. M is an integer such as M=1, 2, 3, and greater. To obtain the condition of $L_{cav}=ML_{source}$, using the feedback signal of photodetector, the length of $L_{source}$ is changed by piezo actuator connected to a cavity of pulsed laser light source. If the resonance between a cavity of pulsed laser light source and the OEC is poor, the pulsed laser enhancement in the OEC becomes smaller, and then, the signal of the photodetector becomes weaker.

In another example, the controller has a second control is $L_{cav}=N(\lambda/2n)$. Each cavity length ($L_{cav}$) of the OEC is configured at $L_{cav}=N(\lambda/2n)$, and each cavity has a same N value and same $\lambda$ to maintain the same cavity length of the OEC, whereupon $\lambda$ is an emission wavelength of the laser light source, n is a refractive index of air or vacuum, and N is an integer such as N=1, 2, 3, and greater. $L_{cav}=N(\lambda/2n)$ is a basic resonant condition of each OEC. In an example, the present fusion reactor uses about 200 OECs. Each OEC should have the same cavity length for the others, and the value of N is the same for each OEC. Using the feedback signal of photodetector and an oscilloscope (which is not shown), we adjust the N value or cavity length by moving the second mirror of the OEC by using the piezo actuator connected to the second mirror. $\lambda$ is controlled by adjusting an emission wavelength of the laser light source to maintain the same emission wavelength of each OEC.

In an example, the controller has a third control where each second mirror is moved for a round trip time of the pulsed laser beam in the OEC to be equal to a repetition rate (or time) of a pulse of the single mode pulsed laser light source characterized by a frequency ranging from 0.1 MHz to 5 MHz. The roundtrip time of the pulsed laser beam in the OEC is measured using the photodetector placed near the mirror of the OEC. Using the signal of the photodetector and an oscilloscope which is not shown in the figure, the second mirror is moved by using the piezo actuator connected to the second mirror. Then the repetition rate of each pulsed laser light source with the frequency from 0.1 MHz to 5 MHz becomes equal to the a round trip time of each pulsed laser beam in each OEC. Also, using electro-optic modulator (EOM) and acousto-optic modulator (AOM), the frequency and the phase of each single mode amplified pulsed laser device is adjusted for the a round trip time and the phase of each pulsed laser beam in the OEC to be equal to the repetition rate and the phase of the pulsed laser device. Then, each pulsed laser beam in the OEC is controlled to have the same repetition or frequency and the phase by using a computer and feedback circuit.

In an example, the controller has another (e.g., final) control that a repetition rate or frequency of the final intensity pulse of each of the OECs and a repetition rate or frequency of supply of fuel pellet or container comprising the fuel pellet inside are synchronized with the same frequency from 1 Hz to 50 Hz. Such synchronized frequency is achieved by connecting each controller of OEC to a main computer or other computer. As shown, two OECs are connected to a computer. However, our present fusion reactor uses about 200 OECs, although there can be fewer or more. In an example, 200 controllers of OECs have to be connected and synchronized to a computer.

The computer controller can be programmed to adjust the modulators in response to the feedback from the detectors, such as an electro-optic modulator (EOM) and an acoustic-optic modulator (AOM), to control the amplitude, phase, or frequency of the laser beam. It can also adjust the amplifier to increase the intensity of the laser beam. It also adjusts a piezo actuator connected to a mirror to change the cavity length in one or more examples. The single mode laser light source can also be controlled by the computer controller to optimize the output of the laser beam. The computer controller can also receive input from other sensor, such as temperature sensors, temperature sensors, vacuum sensors, motion sensors, and others, to further optimize the system. The computer controller can also include a graphical user interface (GUI) to allow for easy monitoring and control of the system by the user. Further details of the present system can be found throughout the present specification and more particularly below.

Figure 16:
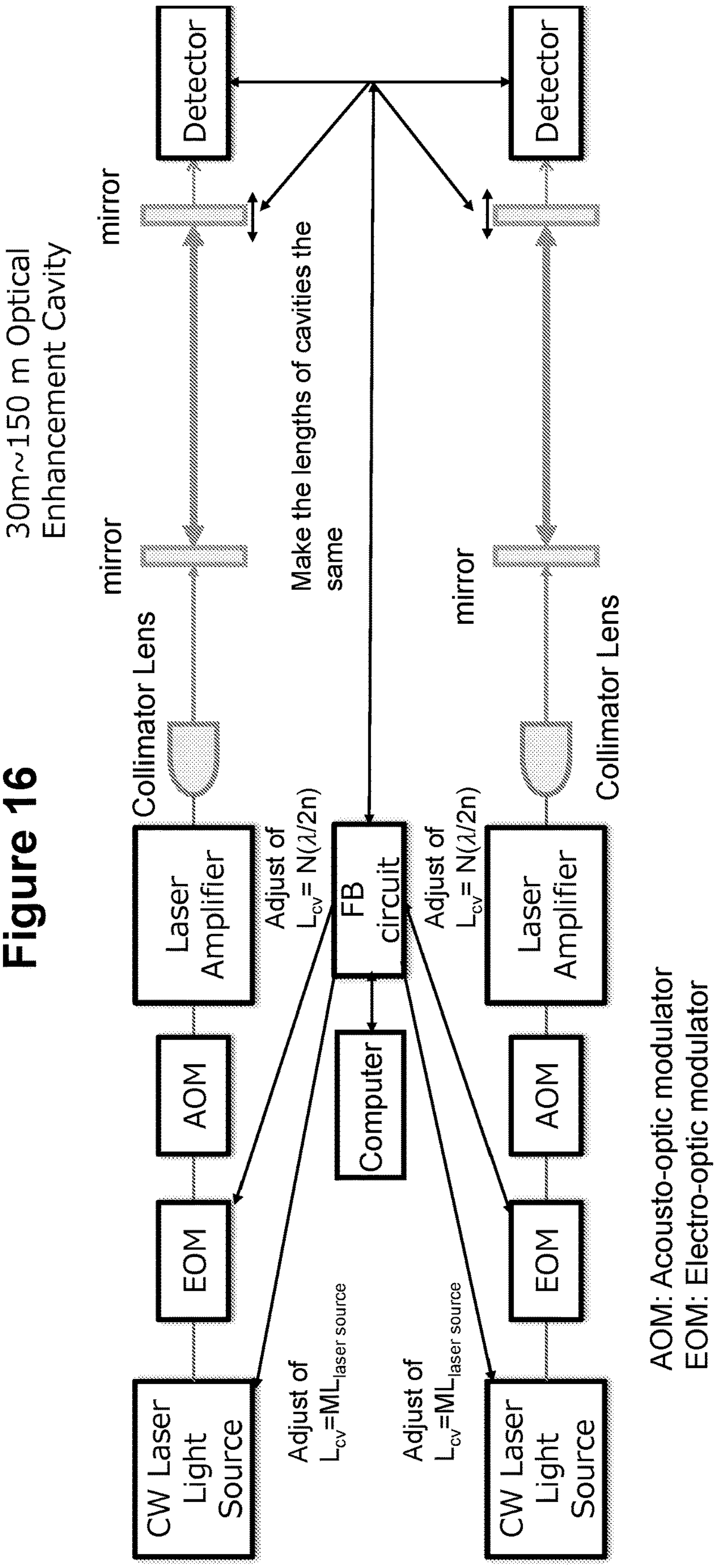
FIG. 16 is a simplified diagram of a control system of a plurality of amplified pulsed laser from CW laser light source configured with a plurality of OECs according to an example of the present invention.

FIG. 16 is a simplified diagram of a control system for a plurality of continuous wave (CW) laser light sources according to an example of the present invention. As shown, a laser light source is coupled to a lane coupled to a resonant cavity. The light source has a single mode CW laser source device. In an example, the single mode CW laser device is characterized by a power from 10 mW to 1 MW, but can be others. The CW laser device is configured to emit electromagnetic radiation as a first laser beam in a wavelength range, e.g., 300 nm to 1070 nm.

As shown, the device has an electro-optic modulator (EOM) coupled to the single mode CW laser device and configured to modulate a phase, a frequency, an amplitude, or a polarization of the first laser beam from the single mode CW laser light source. In particular, the electro-optic modulator (EOM) is a device that uses an electric field to modulate the amplitude, phase, or frequency of an optical beam. It typically consists of a crystal (e.g., such as lithium niobate or lithium tantalate) with a Pockels cell, which is a device that changes the refractive index of the crystal in response to an applied electric field. The Pockels cell is placed between two electrodes, and when a voltage is applied across the electrodes, an electric field is created that changes the refractive index of the crystal, thereby modulating the phase or amplitude of the optical beam passing through it. EOMs are used in laser frequency stabilization.

In a present invention, the EOM is mainly used to adjust a phase of the laser light because each laser light of the OEC has the same phase in an example. Using the feedback signal from a photodetector of the OEC and an oscilloscope (not shown), the phase of the laser light of each OEC is adjusted to be the same by the EOM. All of the laser light of the OEC have the same phase by adjusting the EOM in an example. If the phase of laser beam of each OEC is different, the total pulsed energy at the intersection of all the laser beam of the OEC at the center of the fusion reactor becomes lower from destructive interference.

The device has an acoustic optic modulator (AOM) or a semiconductor optical amplifier (SOA) coupled to the EOM and configured to output a pulsed laser beam. In particular, the electro-optic modulator is a device that uses an electric field to modulate the amplitude, phase, or frequency of an optical beam. It typically includes a crystal (e.g., such as tellurium dioxide (TeO2), crystalline quartz and fused silica etc.), which is a device that changes the refractive index of the crystal in response to an applied electric field. The Pockels cell is placed between two electrodes, and when a voltage is applied across the electrodes, an electric field is created that changes the refractive index of the crystal, thereby modulating the phase or amplitude of the optical beam passing through it.

In a present invention, the AOM is used to make a laser pulse with a pulse width of 1~10 nanoseconds and the frequency of 0.1 MHz~5 MHz using an on-off switching ability of the AOM because laser light source is a CW laser in an example. The frequency and pulse width of the pulse of the AOM should be same to the pulse width and frequency of laser light of each OEC. Accordingly, the feedback signal of the photodetector placed at the OEC and an oscilloscope (not shown) are used to adjust the frequency and pulse width of the pulse of the AOM. Each laser light each OEC has the same frequency and pulse width by adjusting the AOM. If the pulse width and frequency of laser beam of each OEC is different, the total pulsed energy at the intersection of all the laser beam of the OEC at the center of the fusion reactor becomes lower from destructive interference.

In an example, the pulse repetition rate of AOM has to be same as the roundtrip time of laser light in the OEC. Accordingly, the feedback signal of the photodetector placed at the OEC and an oscilloscope are used to adjust the pulse repetition rate of AOM. Each laser light of each OEC has the same roundtrip time by adjusting the AOM. If the roundtrip time of laser beam of each OEC is different, the total pulsed energy at the intersection of all the laser beam of the OEC at the center of the fusion reactor becomes lower.

In an example, the semiconductor optical amplifier (SOA) is a device that uses the properties of semiconductor materials to amplify an optical signal. The SOA has the same ability of an on-off switching ability by amplifying the laser light source using pulsed pumping. Then, the pulsed laser light is generated using SOA. Thus, the SOA has the same purpose of the AOM to make the pulsed laser because the laser light source is a CW laser. A variety of III-V compound semiconductor materials are used as SOA such as InGaAsP, AlInGaP, AlInGaN and others depending on the emission wavelength of the laser light and application.

The device has a laser amplifier device coupled to the AOM and/or SOA. In an example, the laser amplifier is a device that increases the intensity of a laser beam by amplifying the optical power. There are several types of laser amplifiers, but one common example is a solid-state laser amplifier. The solid-state laser amplifier has a gain medium, such as a crystal or a glass rod, that is pumped with a high-power laser or a flashlamp to excite the atoms or ions in the medium. The gain medium is placed inside a resonant cavity, which is designed to enhance the amplification of the laser beam.

The laser beam to be amplified, known as the "seed" beam, is directed through the gain medium where it is amplified by the excited atoms or ions. The amplified beam is then passed through an output coupler which reflect a portion of the beam back into the gain medium to be amplified again and the rest of the beam is passed through as the output beam. The gain medium amplifies the seed beam by stimulated emission, which is the process in which the excited atoms or ions emit photons that are in phase with the seed beam, thereby increasing its intensity. The output of laser amplifiers can range from milliwatts to terawatts, depending on the gain medium and the pump power used. In an example, the laser amplifier is configured to amplify an intensity of a peak intensity of the laser beam and is configured to generate a pulsed laser with a frequency ranging from 0.1 MHz to 5 MHz, among others.

An example of the laser amplifier is: an Innoslab amplifier, fiber amplifier, amplifier associated with a coherent beam combining (CBC), divided-pulse amplification (DAP), amplifier associated with an optical phase array (OPA), a diode pumped solid state (DPSS) amplifier and a chirped pulse amplification (CPA) and others.

The device has a collimator lens coupled to the laser amplifier device and configured to uniformly irradiate the pulse laser beam to a backside of one of a pair of mirrors. After collimator lens, another lens such as convex lens could be inserted for the laser beam to be focused to the center of the OEC using a concave mirror. In this case, collimator lens is used to collect the laser beam to convex lens. In the present invention, the collimator lens should be replaced with optical elements in serial, which include a collimator lens, a convex lens and others. The concave mirrors of the OEC focus the laser beam to the center of the OEC. The optical elements coupled to the concave mirror of the OEC have to focus the laser beam to the center of the OEC in a preferred example.

In an example, the collimator lens is a device that is used to configure a laser beam for uniform irradiation on a back of a mirror device. It is a type of optical lens that is designed to take a diverging beam of light and convert it into a parallel beam. The collimator lens typically has one or more optical elements, such as spherical lenses, cylindrical lenses, or aspheric lenses, that are arranged in a specific configuration to achieve the desired collimation of the laser beam.

The collimator lens is placed in front of the laser source, and the laser beam is directed through the lens, which collimates the beam by focusing the light rays with an appropriate beam profile to fit to the optical mode in the cavity, typically the shape has Gaussian profile. The beam is then directed towards the back of the mirror device. The collimator lens is critical for ensuring that the reflected laser beam is of uniform intensity and has a small convergence/divergence angle, which is important in the present application. The lens can be made of a variety of suitable materials such as glass, silicon oxide, quartz, plastic or even metal in some cases. An example of a collimator lens is synthetic quartz.

In an example, a Fabry Perot resonant cavity, provided from a plurality of resonant cavities, and is derived from the uniformly irradiated pulse laser beam onto the back side of the mirror. In an example, the resonant cavity is coupled to receive an amplified laser beam from the laser amplifier device through the optical lens and configured to be circulated between the pair of mirror devices for at least 10 to 100,000 cycles to cause the laser beam to increase in intensity from an initial intensity to a final intensity and resonate between the pair of mirror devices. Each of the resonant cavities is an optical enhancement cavity (OEC). Each OEC is characterized by a cavity length with a cavity length fluctuation of less than $\pm 2\times(\lambda/2n)$, where λ is an emission wavelength of a laser light source, n is a refractive index in the OEC.

As shown, a computer controller and feedback circuit are coupled to a detector and each element including modulators, laser amplifier, and source of the pulsed laser light source. As shown, the computer controller for receiving feedback from a feedback circuit coupled to a plurality of detectors coupled to a resonant cavity and adjusting a variety of modulators, an amplifier, and single mode laser light source is a system that is used to control the output of a laser beam. The feedback circuit, which is coupled to a plurality of detectors, is used to measure the characteristics of the laser beam, such as its intensity, phase, and frequency, within the resonant cavity. Such information is then sent to the computer controller, which uses it to adjust the various modulators, the amplifier, and the single mode laser light source to optimize the output of the laser beam.

The computer controller can be programmed to adjust the modulators in response to the feedback from the detectors, such as an electro-optic modulator and an acoustic-optic modulator, to control the amplitude, phase, or frequency, pulse width of the laser beam. It can also adjust the amplifier to increase the intensity of the laser beam. The single mode laser light source can also be controlled by the computer controller to optimize the output of the laser beam. The computer controller can also receive input from other sensor, such as temperature sensors, temperature sensors, vacuum sensors, motion sensors, and others, to further optimize the system. The computer controller can also include a graphical user interface (GUI) to allow for easy monitoring and control of the system by the user. Further details of the present system can be found throughout the present specification and more particularly below.

In an example, a first control of OEC is $L_{cav}=ML_{source}$. A cavity length ($L_{source}$) of a CW laser light source, which is configured to $L_{cav}=ML_{source}$ maintains a resonance between the CW laser light source and the OEC whereupon $L_{cav}$ is a cavity length of an optical enhancement cavity (OEC) formed by a pair of mirrors. M is an integer such as M=1, 2, 3, and greater. To obtain the condition of $L_{cav}=ML_{source}$, using the feedback signal of photodetector and an oscilloscope, the length of $L_{source}$ is changed by piezo actuator connected to a cavity of CW laser light source. If the resonance between a cavity of CW laser light source and the OEC is poor, the pulsed laser enhancement in the OEC becomes smaller, and then, the signal of the photodetector becomes weaker.

A second control is $L_{cav}=N(\lambda/2n)$. Each cavity length ($L_{cav}$) of the OEC is configured at $L_{cav}=N(\lambda/2n)$, and each cavity has a same N value and same λ to maintain the same cavity length of the OEC, whereupon λ is an emission wavelength of the laser light source, n is a refractive index of air or vacuum, and N is an integer such as N=1, 2, 3, and greater. $L_{cav}=N(\lambda/2n)$ is a basic resonant condition of each OEC. The present fusion reactor uses about 200 OECs, wherein each OEC should have the same cavity length, and the value of N should be the same for each OEC. Using the feedback signal of photodetector and an oscilloscope, N or cavity length is adjusted by moving the second mirror of the OEC by using the piezo actuator connected to the second mirror. λ is controlled by adjusting an emission wavelength of the laser light source to maintain the same emission wavelength of each OEC.

A third control is wherein each second mirror is moved fora round trip time of the pulsed laser beam in the OEC to be equal to a repetition rate (or time) of a pulse of the AOM by a frequency ranging from 0.1 MHz to 5 MHz. The roundtrip time of the pulsed laser beam in the OEC is measured using the photodetector placed near the mirror of the OEC and an oscilloscope which is not shown in the figure. Using the signal of the photodetector, the second mirror is moved by using the piezo actuator connected to the second mirror. Then the repetition rate of AOM with the frequency from 0.1 MHz to 5 MHz becomes equal to the a round trip time of each pulsed laser beam in each OEC. Using electro-optic modulator (EOM) and acousto-optic modulator (AOM), the phase, the frequency and the pulse width of EOM and AOM is adjusted for phase, the round trip time, frequency and pulse width of each pulsed laser beam in the OEC to be equal to those of EOM and AOM. Then, each pulsed laser beam in the OEC is controlled to have the same repetition or frequency, pulse width and the phase by using a computer and feedback circuit.

Another (or final) control includes a repetition rate or frequency, pulse width and phase of the final intensity pulse of each of the OECs and a repetition rate or frequency of supply of fuel pellet or container comprising the fuel pellet inside are synchronized with the same frequency from 1 Hz to 50 Hz, among others. The control is achieved by connecting each controller of the OEC to main computer. As shown, two OECs are connected to a computer. The present fusion reactor uses about 200 OECs, which can be less or more. Accordingly, 200 controllers of the respective OECs are connected to a computer system.

Figure 17:
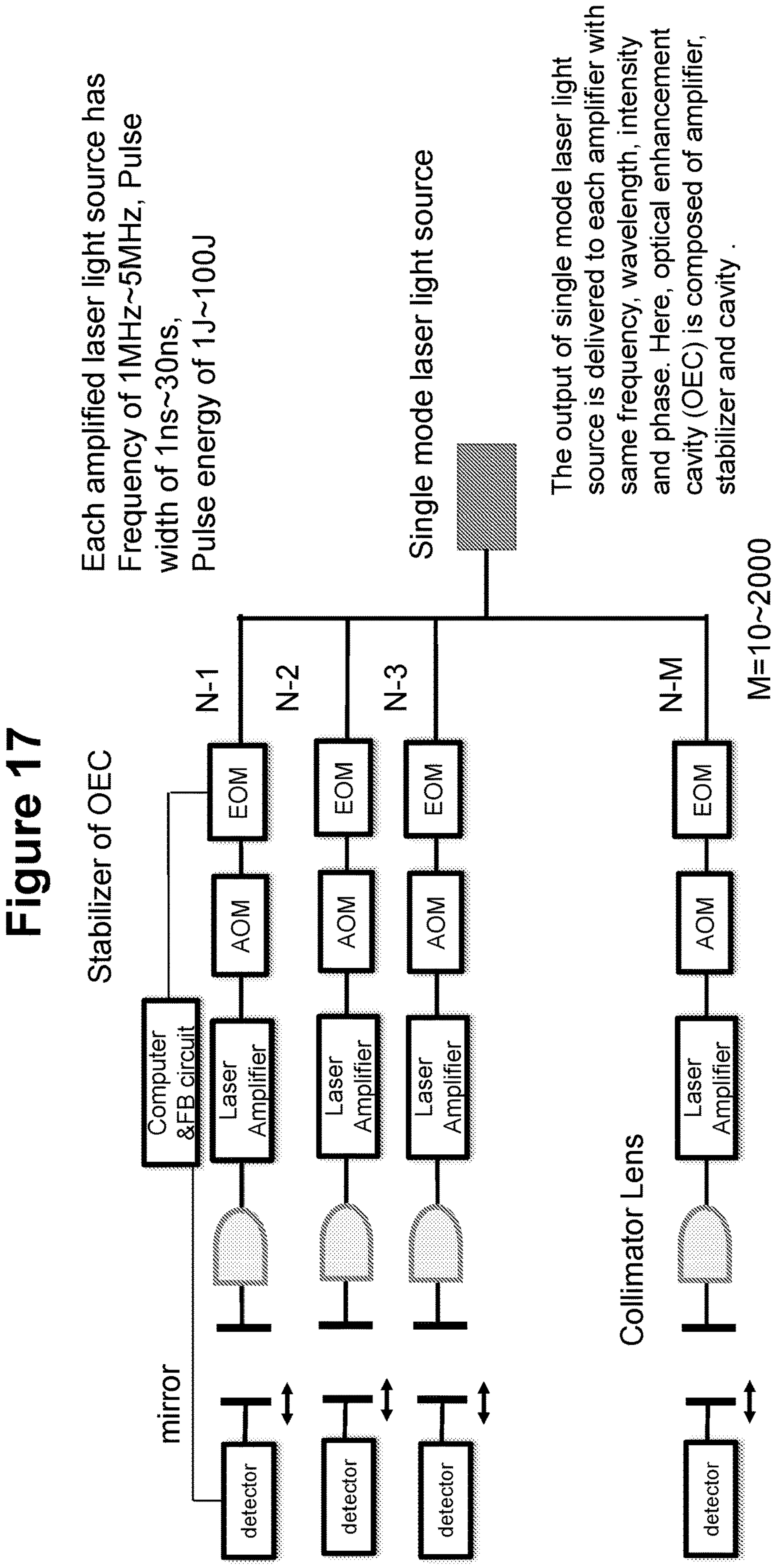
FIG. 17 is a simplified diagram of a plurality of OECs coupled to a single mode laser light source according to an example of the present invention.

FIG. 17 is a simplified diagram of a plurality of optical enhancement cavity coupled to a single mode CW laser light source according to an example of the present invention. As shown, a laser source device is coupled to plurality of Fabry Perot resonators to initiate laser fusion. In an example, the single-mode continuous wave (CW) laser device has an output power of 10 mW to 1 MW, but can be others. The CW laser device is configured to emit electromagnetic radiation as a laser beam in a wavelength range of 300 nm to 1070 nm, among others. An example of the CW laser device is an 1 kW CW single mode laser, among others.

The device has a beam splitter device coupled to the single mode laser device. The beam splitter is configured to split the laser beam from the CW laser device into M individual beams, where M is a number greater than 10 and less than 2000. Each individual beam is coupled to an output of the beam splitter device. Each individual beam has an initial beam intensity, frequency, wavelength, phase, and wave shape. Each of the individual beams has the same frequency, wavelength, phase, and wave shape as other individual beams as shown in parallel paths. In an example, the device has an input waveguide device coupled to the output to receive the individual beam from the beam splitter device. The input waveguide device is coupled to the beam splitter, as shown.

In an example, an electro-optic modulator (EOM) is coupled to the input waveguide device, and configured to modulate a phase, a frequency, an amplitude, or a polarization of the split laser beam from the single mode CW laser source. In particular, the electro-optic modulator (EOM) is a device that uses an electric field to modulate the amplitude, phase, or frequency of an optical beam. It typically consists of a crystal (e.g., such as lithium niobate or lithium tantalate) with a Pockels cell, which is a device that changes the refractive index of the crystal in response to an applied electric field. The Pockels cell is placed between two electrodes, and when a voltage is applied across the electrodes, an electric field is created that changes the refractive index of the crystal, thereby modulating the phase or amplitude of the optical beam passing through it. EOMs are used in laser frequency stabilization.

In a present invention, EOM is mainly used to adjust a phase of the laser light because each laser light of the OEC has to have the same phase. Using the feedback signal from a photodetector of the OEC and an oscilloscope which is not shown, the phase of the laser light of each OEC is adjusted to be the same by the EOM. All of the laser light of the OEC have the same phase by adjusting the EOM in an example.

In an example, the device has an acoustic optic modulator (AOM) or a semiconductor optical amplifier (SOA) coupled to the EOM and configured to output a pulsed laser beam. In particular, the electro-optic modulator (EOM) is a device that uses an electric field to modulate the amplitude, phase, or frequency of an optical beam. It typically includes a crystal (e.g., such as tellurium dioxide (TeO2), crystalline quartz and fused silica etc.), which is a device that changes the refractive index of the crystal in response to an applied electric field. The Pockels cell is placed between two electrodes, and when a voltage is applied across the electrodes, an electric field is created that changes the refractive index of the crystal, thereby modulating the phase or amplitude of the optical beam passing through it.

In a present invention, the AOM is used to make a pulse with a pulse width of 1~10 nanoseconds and the frequency of 0.1 MHz~5 MHz using an on-off switching ability of the AOM because laser light source is a laser. The frequency and pulse width of the pulse of the AOM should be same to the those of laser light of each OEC. The feedback signal of the photodetector placed at the OEC and an oscilloscope are used to adjust the frequency and pulse width of the pulse of the AOM. All of the laser lights of the OEC have the same frequency and pulse width by adjusting the AOM.

In an example, the pulse repetition rate of AOM is the same as the roundtrip time of laser light in the OEC. The feedback signal of the photodetector placed at the OEC and an oscilloscope are used to adjust the pulse repetition rate of AOM. All of the laser lights of the OEC have the same roundtrip time by adjusting the AOM in an example.

In an example, the semiconductor optical amplifier (SOA) is a device that uses the properties of semiconductor materials to amplify an optical laser light source. The SOA has the same ability of an on-off switching ability by amplifying the laser light source using the pulsed pumping. The pulsed laser light is generated using SOA. Thus, the SOA has the same purpose of the AOM to make the pulse because the laser light source is a CW laser light source. A variety of III-V compound semiconductor materials are used as SOA such as InGaAsP, AlInGaP, AlInGaN and others depending on the emission wavelength of the laser light.

As shown in FIG. 17, all of laser lights comes from a single laser light source, which is a single-mode CW lasers. After the beam splitter, each split beam goes through EOM, AOM, and amplifier with the same frequency, pulse width and phase. Thus, adjustment of pulse width and phase by EOM and AOM mentioned above is minimized in comparison with the system of FIG. 16 where each CW laser light source is an independent laser light source with a different phase, frequency and pulse width before adjustments.

The device has a laser amplifier device coupled to the AOM and/or SOA. In an example, the laser amplifier is a device that increases the intensity of a laser beam by amplifying the optical power. There are several types of laser amplifiers, but one common example is a solid-state laser amplifier. The solid-state laser amplifier has a gain medium, such as a crystal or a glass rod, that is pumped with a high-power laser or a flashlamp to excite the atoms or ions in the medium. The gain medium is placed inside a resonant cavity, which is designed to enhance the amplification of the laser beam.

In an example, the laser beam to be amplified, known as the "seed" beam, is directed through the gain medium where it is amplified by the excited atoms or ions. The amplified beam is then passed through an output coupler which reflect a portion of the beam back into the gain medium to be amplified again and the rest of the beam is passed through as the output beam. The gain medium amplifies the seed beam by stimulated emission, which is the process in which the excited atoms or ions emit photons that are in phase with the seed beam, thereby increasing its intensity. The output of laser amplifiers can range from milliwatts to terawatts, depending on the gain medium and the pump power used. In an example, the laser amplifier is configured to amplify an intensity of a peak intensity of the laser beam and is configured to generate a pulsed laser with a frequency ranging from 0.1 MHz to 5 MHz, among others. An example of the laser amplifier is an Innoslab amplifier, fiber amplifier, amplifier associated with a coherent beam combining (CBC), divided-pulse amplification (DAP), amplifier associated with an optical phase array (OPA), a diode pumped solid state (DPSS) amplifier and a chirped pulse amplification (CPA) and others.

In an example, the device has a collimator lens coupled to the laser amplifier device and configured to uniformly irradiate the pulse laser beam to a backside of one of a pair of mirrors. After collimator lens, another lens such as convex lens is inserted for the laser beam to be focused to the center of the OEC using a concave mirror. In this case, the collimator lens is used to collect the laser beam to convex lens. In an example, the collimator lens is a device that is used to configure a laser beam for uniform irradiation on a back of a mirror device. It is a type of optical lens that is designed to take a diverging beam of light and convert it into a parallel beam. The collimator lens typically has one or more optical elements, such as spherical lenses, cylindrical lenses, or aspheric lenses, that are arranged in a specific configuration to achieve the desired collimation of the laser beam.

In an example, the collimator lens is placed in front of the laser source, and the laser beam is directed through the lens, which collimates the beam by focusing the light rays with an appropriate beam profile to fit to the optical mode in the cavity, typically the shape has Gaussian profile. The collimated beam is then directed towards the back of the mirror device, where it is reflected and used for uniform irradiation. The collimator lens is critical for ensuring that the reflected laser beam is of uniform intensity and has a small convergence/divergence angle, which is important in the present application. The lens can be made of a variety of suitable materials such as glass, silicon oxide, quartz, plastic or even metal in some cases. An example of a collimator lens is synthetic quartz.

As shown, an optical enhancement cavity (OEC) is coupled to the collimator lens. The OEC receives the uniform laser beam and is configured to be circulated between the pair of mirror devices for at least 10 to 100,000 cycles to cause the source laser beam to increase in intensity from an initial intensity to a final intensity and resonate between the pair of mirror devices, such that the uniform laser beam is characterized by the final intensity, a source wavelength, a source frequency, and a source phase, a source wave shape.

In an example, the OEC is one of a plurality of Fabry Perot resonator cavities numbered from 10 to 1000. Each the plurality of resonator cavities has a center region that intersects with the center region of the other plurality of resonator cavities and coupled to the individual laser beam characterized by the final intensity, the source wavelength, the source frequency, and the source phase to synchronize to other individual laser beams derived from the beam splitter device.

In an example, each of the mirrors is a concave mirror with a high reflection coating of dielectric Distributed Bragg Reflector (DBR). Using the concave mirror, the laser light is focused at a center of the OEC to increase the laser power density at the center of the cavity to generate the laser fusion using the high-power density pulse at the center of the OEC. At the center of the OEC, a beam waste of the laser beam should be less than 800 microns because in the case of the direct fusion, the size of the target of pellet is more than 1 mm. Also, each of the mirror is a deformable mirror to adjust the beam profile of the laser beam. The power density of the laser beam at the surface of dielectric DBR mirrors is less than 10 $J/cm^2$ to reduce and even minimize the damage of the mirrors. When the power of the pulsed laser beam increases, the surface area of the mirrors increases to reduce the power density less than 10 $J/cm^2$. For example, for a pulse energy of 10 KJ, the surface area of the mirror should be more than 1,000 $cm^2$. If it is difficult to obtain the uniform laser beam radiation power density at the surface of concave mirror, the surface area of concave mirror is preferably less than 1,000 $cm^2$.

In an example, the center region of the reactor is coincident to a reaction region of a fusion reactor. The center region is coincident to a center of a fusion reactor in other examples. In an example, the center region is coincident to a point above a center of a fusion reactor. In an example, the center region is coincident to a reactor region for a fusion reactor and comprises a fuel pellet or a container that interacts with a high intensity beam at the center region to initiate a fusion reaction directly or indirectly.

In an example, the plurality of resonator cavities comprises a first group having a first center region and a second group having a second center region, the first center region being spatially apart from the second center region. In an example, the first group and the second group are operable together as the first group and the second group within a time period of 20 nanoseconds or less but can be greater. In an example, the different groups have different pulse energies to preheat a fuel target or container and also provide a final high intensity beam to interact with fusion fuel to cause a fusion reaction at the center of the reactor.

In an example, a first control of OEC is $L_{cav}=ML_{source}$. A cavity length ($L_{source}$) of a CW laser light source, which is configured to $L_{cav}=ML_{source}$ to maintain a resonance between the CW laser light source and the OEC whereupon $L_{cav}$ is a cavity length of an optical enhancement cavity (OEC) formed by a pair of mirrors. M is an integer such as M=1, 2, 3, and greater. To obtain the condition of $L_{cav}=ML_{source}$, using the feedback signal of photodetector and an oscilloscope which is not shown in the figure, the length of $L_{source}$ is changed by piezo actuator connected to a cavity of CW laser light source. If the resonance between a cavity of CW laser light source and the OEC is poor, the pulsed laser enhancement in the OEC becomes smaller, and then, the signal of the photodetector becomes weaker.

In an example, a second control is $L_{cav}=N(\lambda/2n)$. Each cavity length ($L_{cav}$) of the OEC is configured at $L_{cav}=N(\lambda/2n)$, and each cavity has a same N value and same λ to maintain the same cavity length of the OEC, whereupon λ is an emission wavelength of the laser light source, n is a refractive index of air or vacuum, and N is an integer such as N=1, 2, 3, and greater. $L_{cav}=N(\lambda/2n)$ is a basic resonant condition of each OEC. In an example, the present fusion reactor uses about 200 OECs, where each OEC should have the same cavity length, and then the value of N should be the same for each OEC. Using the feedback signal of photodetector and an oscilloscope, N or cavity length is adjusted by moving the second mirror of the OEC by using the piezo actuator connected to the second mirror. Each OEC already has a same emission wavelength of λ because laser light comes from the same single mode laser light source using a beam splitter as shown in FIG. 17.

In an example, a third control is where each second mirror is moved for a round trip time of the pulsed laser beam in the OEC to be equal to a repetition rate (or time) of a pulse of the AOM by a frequency ranging from 0.1 MHz to 5 MHz. The roundtrip time of the pulsed laser beam in the OEC is measured using the photodetector placed near the mirror of the OEC and an oscilloscope. Using the signal of the photodetector, the second mirror is moved by using the piezo actuator connected to the second mirror. Then, the repetition rate of AOM with the frequency from 0.1 MHz to 5 MHz becomes equal to the a round trip time of each pulsed laser beam in each OEC. Using electro-optic modulator (EOM) and acousto-optic modulator (AOM), the phase, the frequency and the pulse width of EOM and AOM is adjusted for phase, the roundtrip time, frequency and pulse width of each pulsed laser beam in the OEC to be equal to those of EOM and AOM. Each pulsed laser beam in the OEC is controlled to have the same repetition or frequency, pulse width and the phase by using a computer and feedback circuit.

A final control is that a repetition rate or frequency, pulse width and phase of the final intensity pulse of each of the OECs and a repetition rate or frequency of supply of fuel pellet or container comprising the fuel pellet inside are synchronized with the same frequency from 1 Hz to 50 Hz in an example. This is achieved by connecting each controller of OEC to a main computer. As shown, 10~2,000 OECs are connected to a single CW laser light source. In an example, the present fusion reactor uses about 10~2,000 OECs. Thus, 10~2,000 controllers of the OECs are connected to a computer.

Each of the plurality of resonator cavities is characterized by a same cavity length ranging from 10 meters to 1500 meters. Each of the cavity regions has a cavity length that is the same, and each of the cavity regions is characterized by a cavity length fluctuation of less than $\pm 2\times(\lambda/2n)$, whereupon $\lambda$ is an emission wavelength of the laser light source, n is a refractive index in the cavity region. Each of the cavity regions is characterized by a cavity length ($L_{sourc}$) of the laser light source is configured at $L_{cav}=ML_{source}$ to maintain resonance between the OEC and the laser light source, whereupon $L_{cav}$ is the cavity length of an optical enhancement cavity (OEC) formed by the pair of mirrors. M is an integer such as M=1, 2, 3, and greater.

Each of the cavity regions is characterized by a cavity length ($L_{cav}$) of the OEC is configured at $L_{cav}=N(\lambda/2n)$. Each cavity has a same N value and same $\lambda$ to maintain the same cavity length of the OEC, whereupon $\lambda$ is an emission wavelength of the laser light source, n is a refractive index in the cavity region, and N is an integer such as N=1, 2, 3, and greater. Each of the cavity regions is characterized with a cavity length configured by moving a mirror which is not coupled to the laser light source (a second mirror). Each of the second mirrors is moved for a round trip time of the laser beam in the cavity to be equal to a repetition rate (or time) of a pulse of a amplifier or the laser light source.

In an example, a photodetector is configured to provides a feedback signal from the photodetector coupled to a back side of a mirror device to detect a signal of the cavity length of the $L_{cav}$. The photodetector is configured to generate a round trip time of the laser beam in the cavity region measured using the feedback signal from the photodetector.

In an example, each of the mirrors is a concave mirror. Alternative, each of the mirrors is a deformable concave mirror. In an example, the mirror device including a concave mirror and a deformable mirror can be used to control the intensity and shape of a high-power laser beam in the cavity. The concave mirror is a type of mirror that is curved inward, and it is used to focus the laser beam to a small spot size at the center of OEC. The concave mirror is typically made of dielectric DBR, metal or a highly reflective coating, such as aluminum or gold, and it is designed to withstand high-power laser beams.

The deformable mirror is a type of mirror that can be adjusted to change the shape of the reflected laser beam. This can be achieved by using a mirror with a thin, flexible substrate that can be deformed by applying an electric or magnetic field or using many small piezo-actuator. Alternatively, it can be achieved by using an array of small micro-mirrors controlled many small piezo-actuator that can be individually adjusted to change the shape of the reflected beam.

The concave mirror is used for all of the mirrors of OEC and the laser beam is directed towards to the center, where it is focused to a small spot size. The concave deformable mirror is also used for all of the mirrors of OEC and the laser beam is directed towards to the center, where it is focused to a small spot size. The deformable mirror can be adjusted to control the beam profile, shape and intensity uniformity of the laser beam. The combination of these two mirrors allows for precise control of the laser beam, which is important to get the uniform high intensity pulse at the center of the OEC and at the center of the fusion reactor.

In an example, a piezo actuator is coupled to the CW laser light source which is configured to move $L_{cav}=ML_{source}$ to maintain a resonance between the CW laser light source and the OEC.

As shown, a computer controller and feedback circuit are coupled to a detector and each element including EOM, AOM, laser amplifier, and source. As shown, the computer controller for receiving feedback from a feedback circuit coupled to a plurality of detectors coupled to a resonant cavity and adjusting a variety of modulators, an amplifier, and single mode laser light source is a system that is used to control the output of a laser beam. The feedback circuit, which is coupled to a plurality of detectors, is used to measure the characteristics of the laser beam, such as its intensity, phase, pulse width and frequency, within the resonant cavity. Such information is then sent to the computer controller, which uses it to adjust the various modulators, the amplifier, and the single mode laser light source to optimize the output of the laser beam.

The computer controller can be programmed to adjust the modulators in response to the feedback from the detectors, such as an electro-optic modulator and an acoustic-optic modulator, to control the amplitude, phase, or frequency of the laser beam. It can also adjust the amplifier to increase the intensity of the laser beam. The single mode laser light source can also be controlled by the computer controller to optimize the output of the laser beam. The computer controller can also receive input from other sensor, such as temperature sensors, temperature sensors, vacuum sensors, motion sensors, and others, to further optimize the system. The computer controller can also include a graphical user interface (GUI) to allow for easy monitoring and control of the system by the user. Further details of the present system can be found throughout the present specification and more particularly below.

Figure 18:
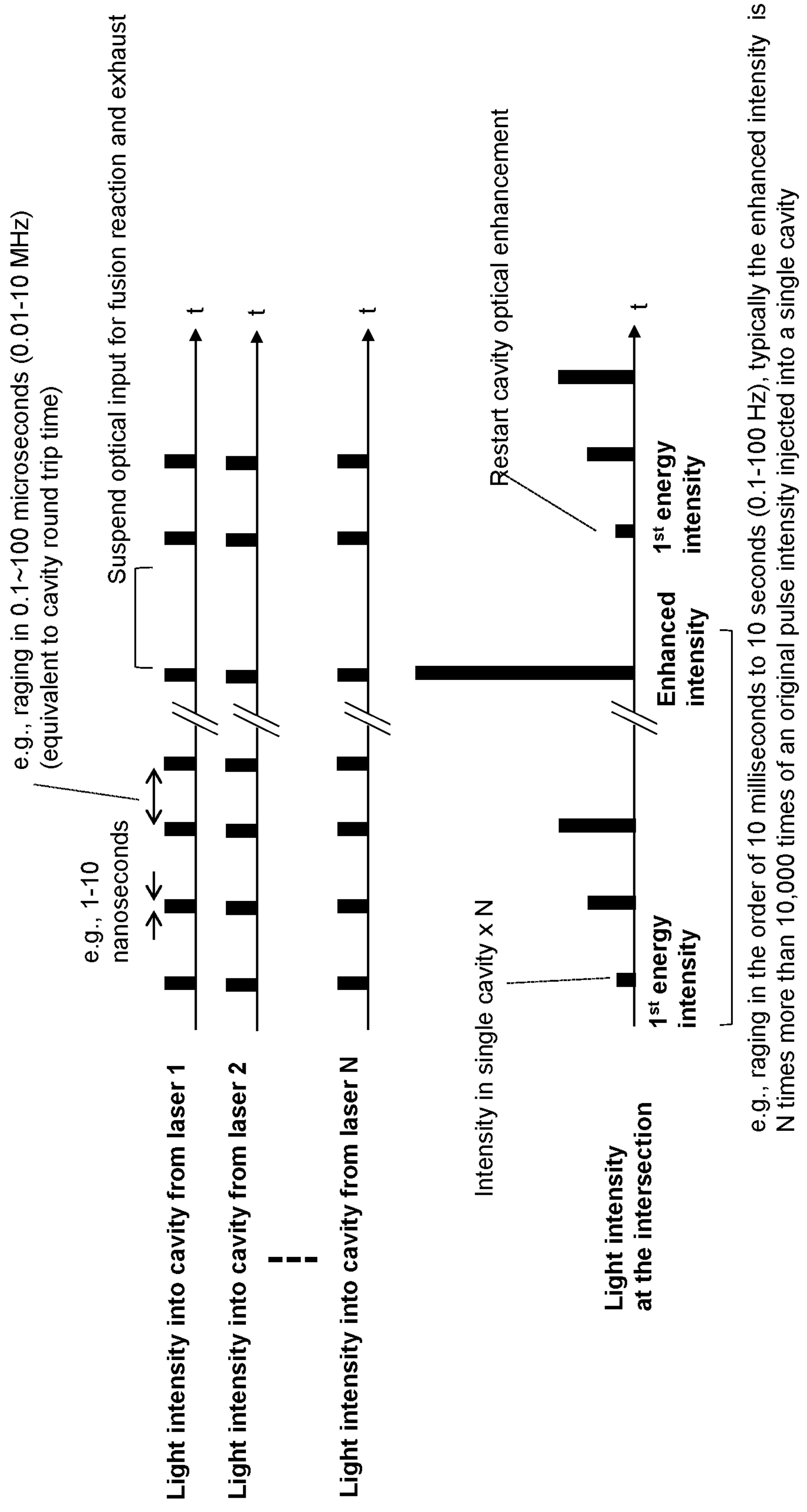
FIG. 18 is a timing diagram illustrating an input pulsed light intensity for each OEC and a cumulative intensity for a plurality of OECs according to an example of the present invention.

FIG. 18 is a timing diagram illustrating light intensity for each resonant cavity and a cumulative intensity for a plurality of cavities according to an example of the present invention. As shown in an upper set of diagrams illustrating light intensity into cavity from laser 1, 2 . . . N, where N is an integer ranging from 10 to 1000, among others. Each laser has a pulse width ranging from, for example, 1 nanosecond to 10 nanoseconds. Each pulse has a pulse repetition rate ranging from 0.1 to 100 microseconds, which equates to frequency of 0.01 to 10 megahertz. Each cavity is configured to resonant and emits a high intensity pulse laser. Energy intensity generally increases linearly at an intersection among the cavities. At the intersection, light intensity increases linearly until all cavities resonant at a desired final intensity to form an enhanced intensity, as shown. Once the enhanced intensity is achieved, a fuel pellet or container is injected into the intersection to interact with the enhanced intensity to cause a fusion reaction.

Figure 19:
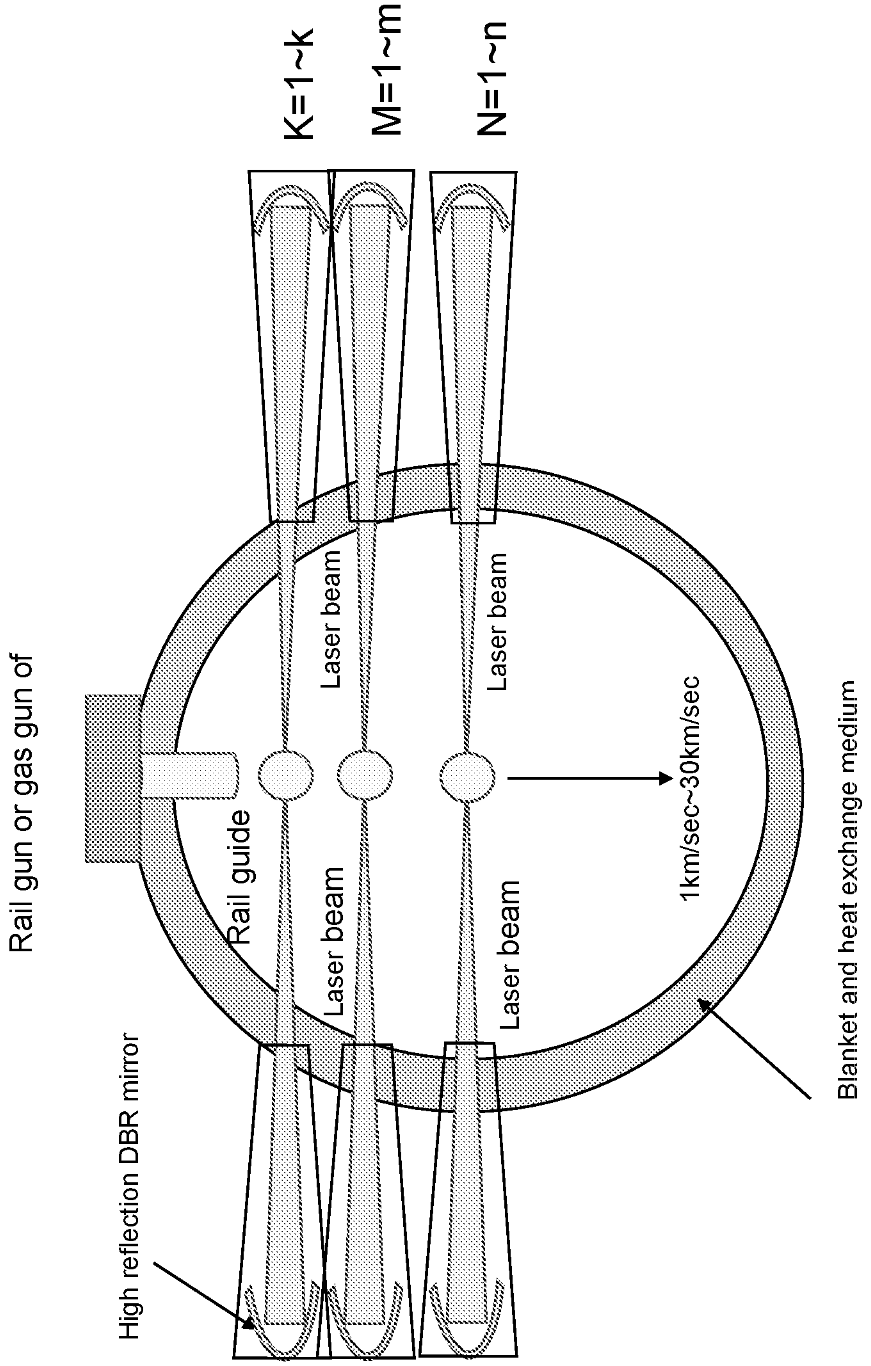
FIG. 19 is a simplified diagram of a fusion reactor configured with multiple groups of OECs according to an example of the present invention.

FIG. 19 is a simplified diagram of a fusion reactor configured with multiple groups of resonant cavities according to an example of the present invention. In an example, the plurality of resonant cavities comprises a first group configured at a first intersection and spatially disposed about a first center region, and a second group configured at a second intersection and spatially disposed about a second center region, whereupon the first center region is spatially separated from the second center region. In an example, the first group and the second group are operable together as the first group and the second group. In an example, the different groups are configured to heat a fuel pellet or container from an initial temperature (or energy level) to a temperature (or energy) that would trigger ignition of a fusion reaction.

In an example, each OEC has a pair of mirrors at peripheral region. As shown, three groups of OECs are included. A first group of OEC is focused to a center of reactor. A second group of OECs is focused to a above a center of reactor. A third group of OECs is focused to a far above a center of reactor. A number of OECS, k, m, and n is 10~200. The first group has a total pulse power of 500 TW with a pulse width of 3 ns. The second group has 10 TW with a pulse width 1 ns. The third group has 10 TW with a pulse width of 1 ns. Each pulse pause time is controlled by changing a distance between each focused point. A number of OEC, k, m and n is 10~200. Each OEC has a same cavity length of 30 m~150 m. Each OEC group is configured to irradiate a fuel pellet or container while it moves from an outer region into a reaction region.

Figure 20:
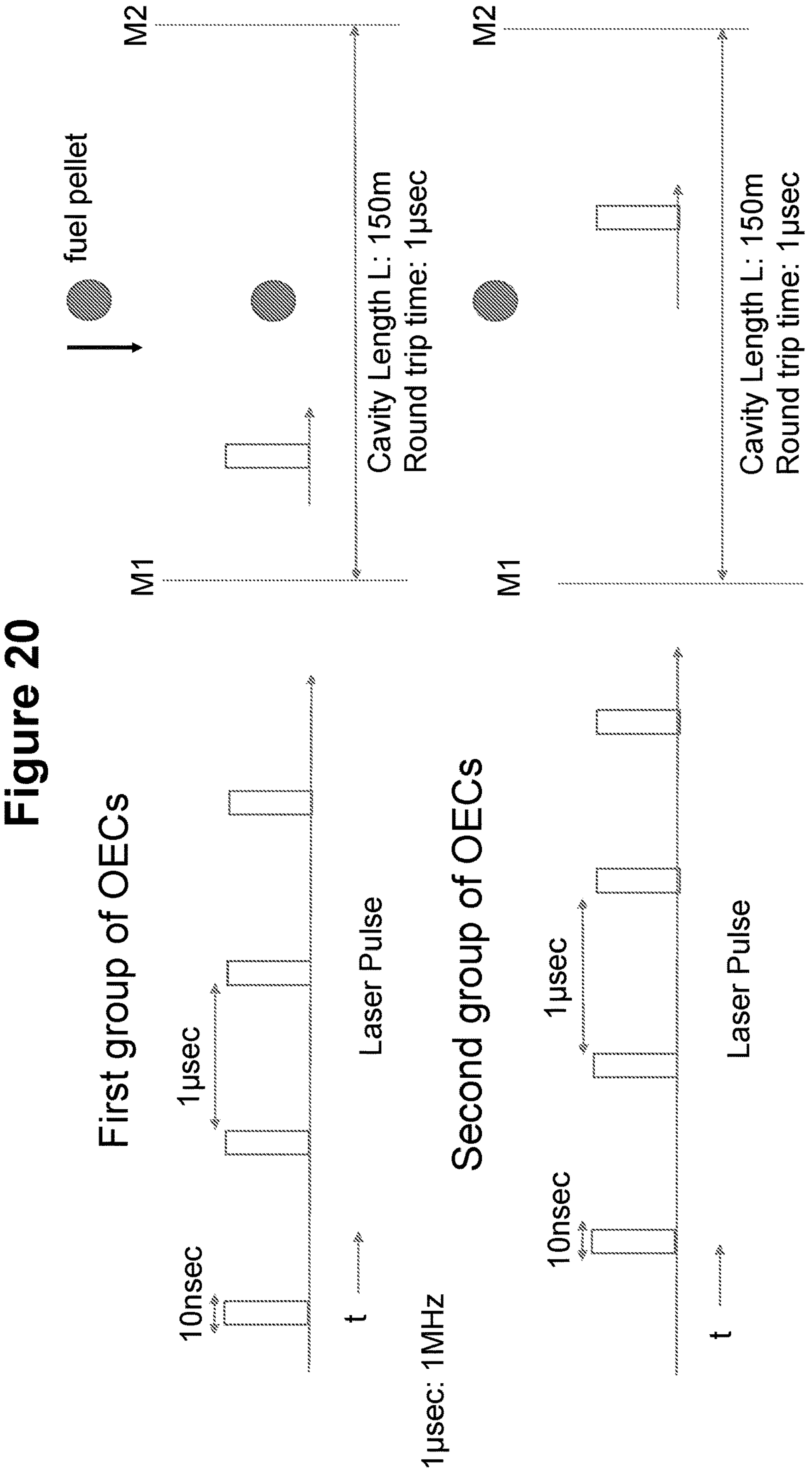
FIG. 20 is a simplified timing diagram of a fusion process with multiple groups of OECs according to an example of the present invention.

FIG. 20 is a simplified timing diagram of a fusion process with multiple groups of OECs according to an example of the present invention. As shown, a first group of laser pulses from a first group of OECs is included. As shown, a second group of laser pulses from a second group of OECs is included. Additional groups of OECs can also be included. A fuel pellet is dispensed along a vertical axis. A laser pulse is irradiate between each pair of mirrors for the first group of OECs. A laser pulse is irradiated between a pair of mirrors for the second group of OECs, as a fuel pellet is moved further down a vertical trajectory. In an example, the fuel pellet is irradiated with the first group of OECs, and then irradiated with the second group of OECs, as the fuel pellet traverse along the vertical trajectory. Further details of the present device and system are found throughout the present specification and more particularly below.

In a preferred example, when a constructive interference becomes a problem (or degrades) at the intersection of all of the OECs at the center of the fusion reactor, a phase of laser beam (or other parameters) in each OEC should be changed to have a different phase (or other parameters) to minimize any destructive interference at the center of the fusion reactor. Preferably, the phase of each laser beam in each OEC is controlled by an EOM or other optical device connected to CW laser source or the pulsed laser source itself which already includes the EOM inside as described above.

In an example, the present invention provides a fusion system. The fusion system has a fusion reactor comprising a reaction region and a laser light source coupled to the fusion reactor. The laser light source has a single mode continuous wave (CW) laser source device, which is characterized by a power from 10 mW to 1 MW and configured to emit electromagnetic radiation as a first laser beam in a wavelength range of 300 nm to 1070 nm.

The light source has an electro-optic modulator (EOM) coupled to the single mode CW laser device and is configured to modulate a phase, a frequency, an amplitude, or a polarization of the first laser beam from the single mode CW laser light source. The light source has an acoustic optic modulator (AOM) or a semiconductor optical amplifier (SOA) coupled to the EOM and configured to output a pulsed laser beam. The source has a laser amplifier device coupled to the AOM or SOA and configured to amplify an intensity of a peak intensity of the pulsed laser beam characterized by a frequency ranging from 0.1 MHz to 5 MHz. The light source has lined up 1~3 optical elements including collimator lens, convex lens and others coupled to the laser amplifier device and configured to irradiate the pulse laser beam to a backside of one of a pair of mirrors. The system has a Fabry Perot resonant cavity, provided from a plurality of resonant cavities, and is derived from the irradiated pulse laser beam onto the back side of one of the mirrors. The resonant cavity is coupled to receive an amplified laser beam from the laser amplifier device through the collimator lens and is configured to be circulated between the pair of mirror devices for at least 10 to 100,000 cycles to cause the laser beam to increase in intensity from an initial intensity to a final intensity and resonate between the pair of mirror devices. Each of the resonant cavities is an optical enhancement cavity (OEC). Each OEC is characterized by a cavity length with a cavity length fluctuation of less than $\pm 2\times(\lambda/2n)$, where $\lambda$ is an emission wavelength of a laser light source, n is a refractive index of air or vacuum.

In an example, the amplified laser beam has a frequency ranging from 0.1 MHz to 5 MHz, a pulse width ranging from 10 femtoseconds to 30 ns, and a pulse energy ranging from 0.1 J to 1 MJ.

In an example, the system has a fuel pellet or container comprising the fuel pellet inside spatially disposed within the reaction region. In an example, the reaction region is concentric with a center region of the fusion reactor and is coupled to the plurality of resonant cavities at an intersection or near the intersection of the plurality of resonant cavities within the reaction region to provide an energy level at the intersection or near the intersection sufficient to ignite the fuel pellet directly or indirectly for a fusion reaction.

In an example, the center region is coincident to the reactor region of a fusion reactor. In an example, the center region is coincident to a center of the fusion reactor. In an example, the center region is coincident to a spatial point above a center of the fusion reactor. In an example, the center region is coincident to the reactor region for a fusion reactor and comprises a fuel pellet or a container that interacts with a high intensity beam at the center region to initiate a fusion reaction directly or indirectly.

In an example, each of the plurality of resonant cavities is characterized by a same cavity length ranging from 10 m to 1500 m. In an example, each of the plurality of resonant cavities is characterized by a cavity length ($L_{source}$) of a CW laser light source is configured to $L_{cav}=ML_{source}$ to maintain a resonance between the CW laser light source and the OEC whereupon $L_{cav}$ is a cavity length of an optical enhancement cavity (OEC) formed by a pair of mirrors. M is an integer such as M=1, 2, 3, and greater. In an example, each of the cavity regions is characterized by a cavity length ($L_{cav}$) of the OEC is configured at $L_{cav}$=N(λ/2n), and each cavity has a same N value and same λ to maintain the same cavity length of the OEC, whereupon λ is an emission wavelength of the laser light source, n is a refractive index in the cavity region, and N is an integer such as N=1, 2, 3, and greater. In an example, each of the plurality of resonant cavities has a length adjusted by moving a mirror which is not configured to the source laser beam, the mirror is a second mirror.

In an example, each second mirror is moved for a round trip time of the laser beam in the resonant cavity to be equal to a repetition rate (or time) of a pulse of the single mode amplified pulsed laser device or pulsed laser light source characterized by a frequency ranging from 0.1 MHz to 5 MHz. In an example, a piezo actuator is coupled to the CW laser light source and configured to moved $L_{cav}$=$ML_{source}$ to maintain a resonance between the CW laser light source and the OEC. In an example, all of mirrors of OEC are concave or deformable concave.

In an example, the present invention provides a laser fusion system. The system has a reactor housing, which includes an interior region maintained in a vacuum or atmospheric pressure environment. The system has a reaction region within a vicinity of a spatially center region of the reactor housing. The system has a peripheral region formed within an interior of the reactor housing, the peripheral region surrounding the reactor region. A plurality of Fabry Perot cavity regions numbered from 1 through N are configured within the interior region of the reactor housing and spatially configured around the peripheral region. Each of the plurality of cavity regions extends from a first side of the peripheral region to a second side of the peripheral region. The first side opposes the second side. Each cavity region forms a linear path along a diameter of the interior region, such that the plurality of cavity regions forms a hub and spoke configuration such that each cavity region has a center region concentric with the reactor region and each cavity region has a first end coupled to the first side and a second end coupled to the second side of the peripheral region, where N is greater than 10.

The system has a pair of mirrors configured, respectively, on the first end and the second end of the cavity regions and a laser light source selected from a single mode pulse laser light source, a continuous wave (CW) laser light source or an amplifier configured to emit electromagnetic radiation coupled to at least one of the pair of mirror devices. A laser beam propagates from the laser light source between the pair of mirror devices to increase an energy intensity from a first intensity to a second intensity to an $M^{th}$ intensity for M cycles of the laser beam propagating between the pair of mirror devices, where M is greater than 1,000 cycles.

The system has a fuel pellet or container comprising fuel pellet inside disposed within the reactor region and coupled to the plurality of cavity regions as each of the plurality of cavity regions spatially intersect within the reactor region to provide an energy level sufficient to ignite the fuel pellet directly or indirectly for a fusion reaction.

In an example, the cavity region is defined by a spatial length between each pair of mirrors that is larger than a diameter of the reactor housing. In an example, each of the cavity regions has a cavity length that is the same, and each of the cavity regions is characterized by a cavity length fluctuation of less than ±2×(λ/2n), whereupon λ is an emission wavelength of the laser light source, n is a refractive index in the cavity region. In an example, each of the cavity regions is characterized by a cavity length ($L_{sourc}$) of the laser light source is configured at $L_{cav}$=$ML_{source}$ to maintain resonance between the OEC and the laser light source, whereupon $L_{cav}$ is the cavity length of an optical enhancement cavity (OEC) formed by the pair of mirrors. M is an integer such as M=1, 2, 3, and greater. Each of the cavity regions is characterized by a cavity length ($L_{cav}$) of the OEC is configured at $L_{cav}$=N(λ/2n), and each cavity has a same N value and same λ to maintain the same cavity length of the OEC, whereupon λ is an emission wavelength of the laser light source, n is a refractive index in the cavity region, and N is an integer such as N=1, 2, 3, and greater. Each of the cavity regions is characterized with a cavity length configured by moving a mirror which is not coupled to the laser light source (a second mirror). Each of the second mirrors is moved for a round trip time of the laser beam in the cavity to be equal to a repetition rate (or time) of a pulse of an amplifier or the laser light source.

In an example, a piezo actuator is coupled to laser light source to configure $L_{cav}$=$ML_{source}$ to maintain a resonance between the laser light source and the OEC. A photodetector is configured to provides a feedback signal from the photodetector coupled to a back side of a mirror device to detect a signal of the cavity length of the $L_{cav}$. The photodetector is configured to generate a round trip time of the laser beam in the cavity region measured using the feedback signal from the photodetector.

In an example, the present invention provides a laser light source device coupled to a plurality of Fabry Perot resonant cavities to initiate laser fusion. The device has a continuous wave (CW) laser light source coupled with an electro-optic modulator (EOM) to modulate a phase, a frequency, an amplitude, or a polarization of a beam from the CW laser light source. The device has an acoustic optic modulator (AOM) or a semiconductor optical amplifier (SOA) coupled to the EOM to output a pulsed laser beam. The device has a laser amplifier device coupled to the AOM or SOA and configured to amplify an intensity of a peak intensity of the pulsed laser beam characterized by a frequency ranging from 0.1 MHz to 5 MHz. The device has a couple of optical elements such as collimator lens, convex lens and others coupled to the laser amplifier device to irradiate the pulse laser beam to a backside of one of a pair of the mirrors. A Fabry Perot resonant cavity, provided from the plurality of resonant cavities, is derived from the irradiated pulse laser beam onto the back side of one of the mirrors. The resonant cavity is coupled to receive an amplified laser beam from an output of the laser amplifier device through a couple of optical elements and configured to be circulated between the pair of concave mirror devices for at least 10 to 100,000 cycles to cause the laser beam to increase in intensity from an initial intensity to a final intensity and resonate between the pair of mirror devices.

In an example, the present invention provides a laser source device coupled to a plurality of Fabry Perot resonant cavity to form a plurality of optical enhancement cavities (OECs) to initiate laser fusion. The device has a single mode pulsed laser source device with a pulsed power from 1 kW to 10 TW and configured to emit electromagnetic radiation as a source pulsed laser beam in a wavelength range of 300 nm to 1070 nm. The device has a resonant cavity region coupled to receive a source pulsed laser beam from an output and configured to be circulated between a pair of mirror devices for at least 10 to 100,000 cycles to cause the source pulse laser beam to increase in intensity from an initial intensity to a final intensity and resonate between the pair of mirror devices, the resonant cavity region being one of a plurality of OECs, each of the OECs being characterized by a same cavity length with a cavity length fluctuation of less than ±2×(λ/2n), where λ is an emission wavelength of the single mode pulsed laser source, and n is a refractive index in the cavity region. The device has a fuel pellet or container comprising the fuel pellet inside disposed within a reactor region and coupled to the plurality of resonant cavity regions as each of the plurality of cavity regions spatially intersect within the reactor region to provide an energy level sufficient to ignite the fuel pellet directly or indirectly for a fusion reaction.

In an example, the OEC is one of the plurality of OECs numbered from 10 to 1000, and each OEC has a center region that interests with the center region of the other OECs and coupled to the single mode pulsed laser source device.

In an example, the source pulsed laser beam has a frequency ranging from 0.1 MHz to 5 MHz, a pulse width ranging from 10 femtosecond to 30 ns, and a pulse energy ranging from 0.1 J to 1 MJ, and source pulsed laser beam is matched in a frequency, a pulse width, and a pulse energy.

In an example, the present invention provides a laser fusion system. The system has a reactor housing, which has an interior region maintained in a vacuum or atmospheric pressure environment. The system has a reaction region within a vicinity of a spatially center region of the reactor housing and a plurality of Fabry Perot cavity regions within the interior region of the reactor housing and spatially configured around the reaction region such that each of the plurality of cavity regions extending linearly from a first side of the reaction region to a second side of the reaction region forming a linear path along a diameter of the interior region.

Preferably, the system has a first group of the plurality of Fabry Perot cavity (optical enhancement cavity (OEC)) regions numbered from 1 to N configured as a first hub and spoke configuration configured at a first spatial region, each cavity region having a first center region concentric with the reaction region, where N is greater than 2.

Preferably, the system has a second group of the plurality of Fabry Perot cavity (optical enhancement cavity (OEC)) regions numbered from 1 to M configured as a second hub and spoke configuration at a second spatial region, each cavity region having second center region concentric at a second spatial region, the second center region being at a different spatial location from the first center region, each cavity region having a second center region concentric with the reaction region, where M is greater than 2.

In an example, the system has a pair of mirrors configured, respectively, on the first end and the second end of the cavity regions. The system has a first laser light source selected from a first single mode pulse laser light source, a first continuous wave (CW) laser light source or a first amplifier configured to first emit electromagnetic radiation coupled to at least one of the pair of mirror devices in the first group of the plurality of Fabry Perot cavity regions. A first laser beam propagates from the first laser light source between the pair of mirror devices increases in energy intensity from a first intensity to a second intensity to an Pth intensity for P cycles of the first laser beam propagating between the pair of mirror devices, where P is greater than 1,000 cycles. The first laser beam is configured to increase an energy (e.g., temperature) of a fuel pellet directly or indirectly in the first spatial region. A second laser light source selected from a second single mode pulse laser light source, a second continuous wave (CW) laser light source or a second amplifier configured to emit second electromagnetic radiation coupled to at least one of the pair of mirror devices in the second group of the plurality of Fabry Perot cavity regions. A second laser beam propagates from the second laser light source between the pair of mirror devices increases in energy intensity from a first intensity to a second intensity to an Pth intensity for P cycles of the second laser beam propagating between the pair of mirror devices, where P is greater than 1,000 cycles. The second laser beam is configured to increase the temperature of a fuel pellet directly or indirectly in the second spatial region to initiate a fusion reaction.

In an example, the system has a fuel pellet or container comprising fuel pellet inside disposed within the reactor region and coupled to the first group of the plurality of cavity regions and the second group of the plurality of cavity regions.

In an example, the cavity region is defined by a spatial length between each pair of mirrors that is larger than a diameter of the reactor housing; wherein the first spatial region is spatially separate from the second spatial region. In an example, each of the cavity regions has a cavity length that is the same, and each of the cavity regions is characterized by a cavity length fluctuation of less than $\pm 2\times(\lambda/2n)$, whereupon λ is an emission wavelength of the first laser light source or the second laser light source, n is a refractive index of the air or the vacuum.

In an example, the first group of OECs is characterized by a first timing, a first intensity, and a first pulse width of the first laser beam; and the second group of OECs is characterized by a second time, a second intensity, and a second pulse width of the second laser beam; whereupon the first timing being different from the second timing, the first intensity being different from the second intensity, and the first pulse width being different from the second pulse width. In an example, the first group of OECs and the second group of OECs are characterized by a same cavity length and a same frequency.

In an example, each of the OECs is characterized by a repetition rate or a frequency of the first laser beam and the second laser beam and is characterized by a repetition rate or a frequency of a supply of fuel pellet or a container comprising the fuel pellet inside that are synchronized with a same frequency ranging from 1 Hz to 50 Hz.

In an example, each of the cavity regions is characterized by a cavity length ($L_{source}$) of the first laser light source or the second laser light source is configured at $L_{cav}=QL_{source}$ to maintain resonance between the OEC and the first laser light source or the second laser light source, whereupon $L_{cav}$ is the cavity length of an optical enhancement cavity (OEC) formed by the pair of mirrors, whereupon Q is an integer such as Q=1, 2, 3, and greater.

In an example, a piezo actuator is coupled to either the first laser light source or the second laser light source to configure $L_{cav}=QL_{source}$ to maintain a resonance between first light source or the second laser light source and the OEC.

In an example, each of the cavity regions is characterized by a cavity length ($L_{cav}$) of the OEC is configured at $L_{cav}=Q(\lambda/2n)$, and each cavity has a same Q value and same λ to maintain the same cavity length of the OEC, whereupon λ is an emission wavelength of the first laser light source or the second laser light source, n is a refractive index of the air or the vacuum, and N is an integer such as Q=1, 2, 3, and greater. In an example, each of the cavity regions is characterized with a cavity length configured by moving a mirror which is not coupled to the first laser light source or the second laser light source (a second mirror). In an example, each of the second mirrors is moved for a round trip time of the laser beam in the cavity to be equal to a repetition rate (or time) of a pulse of an amplifier or the first laser light source or the second laser light source.

In an example, the system includes a photodetector configured to provides a feedback signal from the photodetector coupled to a back side of a mirror device to detect a signal of the cavity length of the Iv. In an example, the photodetector is configured to generate a round trip time of the laser beam in the cavity region measured using the feedback signal from the photodetector.

In an example, each of the mirror is a concave mirror. In an example, each of the mirrors is a deformable concave mirror.

In an example, the system has a third group of the plurality of Fabry Perot cavity regions up to a Z group of the plurality of Fabry Perot cavity regions, where Z is an integer greater than 3.

In an example, the present invention provides an alternative laser fusion system. The system has a reactor housing, the reactor housing having an interior region maintained in a vacuum or atmospheric pressure environment and a reaction region within a vicinity of a spatially center region of the reactor housing. The system has a plurality of Fabry Perot cavity regions within the interior region of the reactor housing and spatially configured around the reaction region such that each of the plurality of cavity regions extending linearly from a first side of the reaction region to a second side of the reaction region forming a linear path along a diameter of the interior region. The system has a first group of the plurality of Fabry Perot cavity regions numbered from 1 to N configured as a first hub and spoke configuration configured at a first spatial region, each cavity region having a first center region concentric with the reaction region, where N is greater than 2 and a second group of the plurality of Fabry Perot cavity regions numbered from 1 to M configured as a second hub and spoke configuration at a second spatial region, each cavity region having second center region concentric at a second spatial region, each cavity region having a second center region concentric with the reaction region, where M is greater than 2. Preferably, the first spatial region comprises a first intersection of the first group of the plurality of Fabry Perot cavity regions is spatially separate from the second spatial region comprising a second intersection of the second group of the plurality of Fabry Perot cavity regions.

In an example, the first spatial region is formed by a first pulsed laser beam from the first group of the plurality of Fabry Perot cavity regions; and the second spatial region is formed by the second group of the plurality of Fabry Perot cavity regions.

In an example, each of the first pulsed laser beam and the second pulsed laser beam is characterized by a first frequency, a first period, and a first wavelength, each of which is matched, and the second pulsed laser beam is characterized by a second frequency, a second period, and a second wavelength, each of which is matched.

In an example, the first group of the plurality of Fabry Perot cavity regions is configured to increase a temperature (or energy) of a fuel pellet directly or indirectly; and the second group of the plurality of Fabry Perot cavity regions is configured to interact with a fuel in the fuel pellet directly or indirectly to initiate a fusion reaction.

While the above is a full description of the specific examples, various modifications, alternative constructions and equivalents may be used. As an example, the packaged device can include any combination of elements described above, as well as outside of the present specification. In an example, the high intensity laser forms a resonator between the pair of mirror devices using constructive interference of each of the laser beams. In an example, the first path with the high intensity pulse laser is provided in a resonator device. In an example, the present invention provides a system and method to generate aa concentric or spherical resonator within a reaction region to focus laser light at a center of the reactor. Additionally, the terms first, second, third. and final do not imply order in one or more of the present examples. Therefore, the above description and illustrations should not be taken as limiting the scope of the present invention which is defined by the appended claims.

The invention claimed is:

1. A laser source device coupled to a plurality of Fabry Perot resonant cavity to form a plurality of optical enhancement cavities (OECs) to initiate laser fusion, the device comprising:

a single mode pulsed laser source device with a pulsed power from 1 kW to 10 TW and configured to emit electromagnetic radiation as a source pulsed laser beam in a wavelength range of 300 nm to 1070 nm;

a resonant cavity region coupled to receive a source pulsed laser beam from an output and configured to be circulated between a pair of mirror devices for at least 10 to 100,000 cycles to cause the source pulse laser beam to increase in intensity from an initial intensity to a final intensity and resonate between the pair of mirror devices, the resonant cavity region being one of a plurality of OECs, each of the OECs being characterized by a same cavity length with a cavity length fluctuation of less than $\pm 2\times(\lambda/2n)$, where $\lambda$ is an emission wavelength of the single mode pulsed laser source, and n is a refractive index of an air or vacuum; and a fuel pellet or container comprising the fuel pellet inside disposed within a reactor region and coupled to the plurality of Fabry Perot resonant cavity regions as each of the plurality of Fabry Perot resonant cavity regions spatially intersect within the reactor region to provide an energy level sufficient to ignite the fuel pellet directly or indirectly for a fusion reaction.

2. The device of claim 1 wherein the OEC is one of the plurality of OECs numbered from 10 to 1000, and each OEC has a center region that interests with the center region of the other OECs and coupled to the single mode pulsed laser source device.

3. The device of claim 1 wherein the source pulsed laser beam has a frequency ranging from 0.1 MHz to 5 MHz, a pulse width ranging from 10 femtosecond to 30 ns, and a pulse energy ranging from 0.1 J to 1 MJ, and source pulsed laser beam is matched in a frequency, a pulse width, and a pulse energy.

4. The device of claim 2 wherein the center region is coincident to the reactor region of a fusion reactor.

5. The device of claim 2 wherein the center region is coincident to a center of the fusion reactor.

6. The device of claim 2 wherein the center region is coincident to a spatial point above a center of the fusion reactor.

7. The device of claim 2 wherein the plurality of OECs comprises a first group configured at a first intersection and spatially disposed about a first center region, and a second group configured at a second intersection and spatially disposed about a second center region, whereupon the first center region is spatially separated from the second center region.

8. The device of claim 7 wherein the first group and the second group are operable together as the first group and the second group.

9. The device of claim 2 wherein each of the plurality of OECs is characterized by a same cavity length ranging from 10 m to 1500 m.

10. The device of claim 2 wherein each of the cavity regions has a cavity length that is the same, and each of the cavity regions is characterized by a cavity length fluctuation of less than $\pm 2\times(\lambda/2n)$, whereupon $\lambda$ is an emission wavelength of the laser light source, n is a refractive index of an air or vacuum.

11. The device of claim 2 wherein each of the cavity regions is characterized by a cavity length ($L_{sourc}$) of the laser light source, which is configured at $L_{cav}=ML_{source}$ to maintain resonance between the OEC and the laser light source, whereupon $L_{cav}$ is the cavity length of an optical enhancement cavity (OEC) formed by the pair of mirrors, M is an integer such as M=1, 2, 3, and greater.

12. The device of claim 1 further comprising a piezo actuator coupled to laser light source to configure $L_{cav}=ML_{source}$ to maintain a resonance between the laser light source and the OEC.

13. The device of claim 2 wherein each of the cavity regions is characterized by a cavity length ($L_{cav}$) of the OEC, which is configured at $L_{cav}=N(\lambda/2n)$, and each cavity has a same N value and same $\lambda$ to maintain the same cavity length of the OEC, whereupon $\lambda$ is an emission wavelength of the laser light source, n is a refractive index of an air or vacuum, and N is an integer such as N=1, 2, 3, and greater.

14. The device of claim 2 wherein each of the cavity regions is characterized with a cavity length configured by moving a mirror which is not coupled to the laser light source (a second mirror).

15. The device of claim 14 wherein each of the second mirrors is moved for a round trip time of the laser beam in the cavity to be equal to a repetition rate (or time) of a pulse of a amplifier or the laser light source.

16. The device of claim 1 further comprising a photodetector configured to provides a feedback signal from the photodetector coupled to a back side of a mirror device to detect a signal of the cavity length of the $L_{cav}$.

17. The device of claim 16 wherein the photodetector is configured to generate a round trip time of the laser beam in the cavity region measured using the feedback signal from the photodetector.

18. The device of claim 1 wherein each of the mirror is a concave mirror which is focused to a center region of the OEC.

19. The device of claim 1 wherein each of the mirror is a deformable concave mirror which is focused to a center region of the OEC.

20. The device of claim 1 further comprising a repetition rate or frequency of the final intensity pulse of each of the OECs and a repetition rate or frequency of supply of fuel pellet or container comprising the fuel pellet inside are synchronized with the same frequency from 1 Hz to 50 Hz.

* * * * *